United States Patent [19]

Ranganayaki

[11] Patent Number: 4,686,476
[45] Date of Patent: Aug. 11, 1987

[54] PLOTTING OF MAGNETOTELLURIC IMPEDANCE TO DETERMINE STRUCTURE AND RESISTIVITY VARIATION OF ANOMALIES

[75] Inventor: Rambabu P. Ranganayaki, Dallas, Tex.

[73] Assignee: Mobil Oil Corporation, New York, N.Y.

[21] Appl. No.: 323,502

[22] Filed: Nov. 23, 1981

[51] Int. Cl.$^4$ .......................... G01V 3/08; G01V 3/38
[52] U.S. Cl. .................................................. 324/350
[58] Field of Search ........................ 324/350, 335, 364

[56] References Cited

U.S. PATENT DOCUMENTS

| | | | |
|---|---|---|---|
| 2,293,024 | 8/1942 | Klipsch | 324/364 |
| 2,677,801 | 5/1954 | Cagniard | 324/1 |
| 2,991,411 | 7/1961 | Freedman | 324/335 X |
| 3,986,207 | 10/1976 | Gerbel et al. | 324/350 X |
| 4,286,218 | 8/1981 | Bloomquist et al. | 324/350 |
| 4,392,109 | 7/1983 | Warner | 324/350 |
| 4,449,099 | 5/1984 | Hoehn | 324/350 |
| 4,473,800 | 9/1984 | Warner | 324/350 |

OTHER PUBLICATIONS

Abramovici, Flavian; "The Forward Magnetotelluric Problem for ... Anisotropic Structure" Geophysics, vol. 39, No. 1, Feb. 1974, pp. 56-58.

Gamble et al, Magnetotellurics with a Remote Magnetic Reference, Geophysics, vol. 44, No. 1, Jan. 1979; pp. 53-68.

"An Investigation of the Magnetotelluric Tensor Impedance Method", D. R. Word, H. W. Smith and F. X. Bostick, Jr., EGRL Tech. Rep. No. 82, Univ. of Texas at Austin, 3-15-70.

"Method of Magnetotelluric Analysis", W. E. Sims and F. X. Boxtick, Jr., EGRL Tech. Rep. No. 58, Univ. of Texas at Austin, 7 Jan. 1969.

"Generalized Thin Sheet Analysis in Magnetotellurics: An Extension of Price's Analysis," R. Ranganayaki and Theodore R. Madden, pp. 445-457 Geophys. J.R. Astr. Soc. (1980).

"Integral Equation Modeling of Three-Dimensional Magnetotelluric Response", Sam C. Ting and Gerald W. Hohmann, pp. 182-197, Geophysics, vol. 46, No. 2 (Feb. 1981).

"Three-Dimensional Modeling in Magnetotelluric and Magnetic Variational Sounding", I. K. Reddy, D. Rankin, & R. J. Phillips, pp. 314-325, Geophys. J.R. Astro. Soc. (1977).

Primary Examiner—Gerard R. Strecker
Attorney, Agent, or Firm—Alexander J. McKillop; Michael G. Gilman; George W. Hager, Jr.

[57] ABSTRACT

In magnetotelluric exploration, plots of equal values of the phase of the determinant of the impedance tensor relating the earth's electric fields to the earth's magnetic fields are plotted to distinguish the structure of resistivity anomalies and separate near surface and deep anomalies. Plots of equal values of the absolute value of the determinant of the impedance tensor are also made. These plots display the dimensionality of the anomaly and produce a better display of anomalies which are at depth.

7 Claims, 46 Drawing Figures

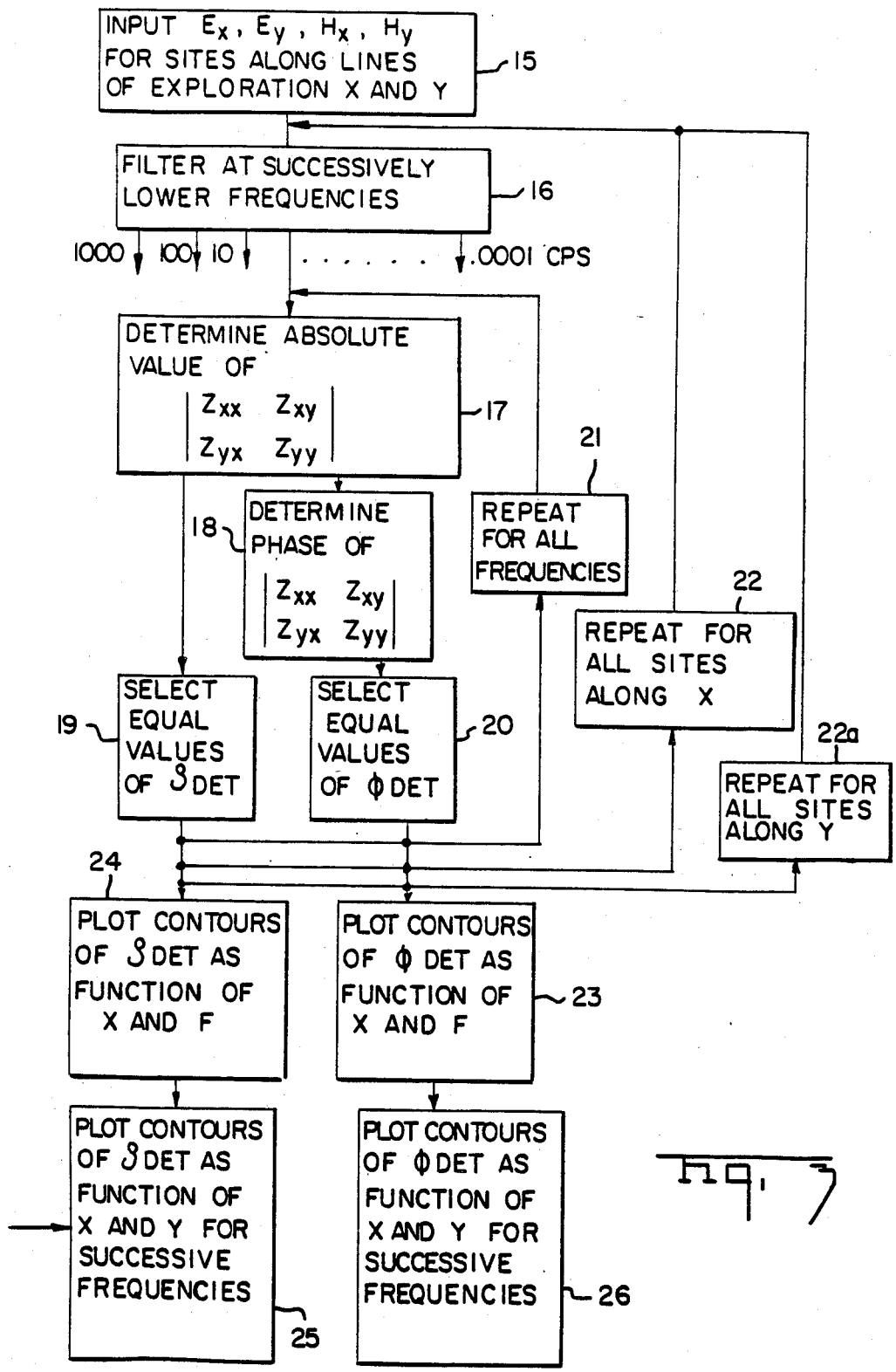

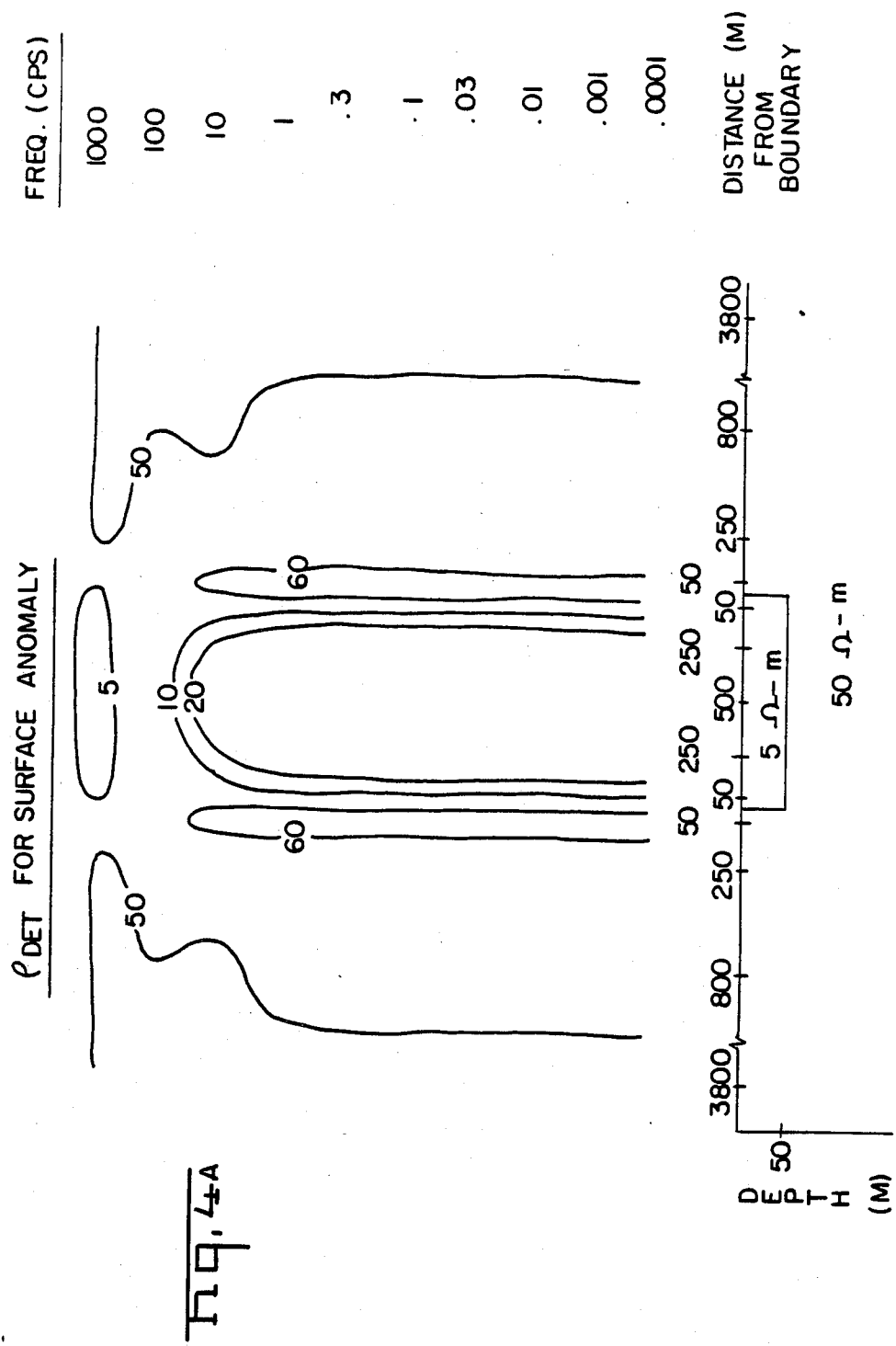

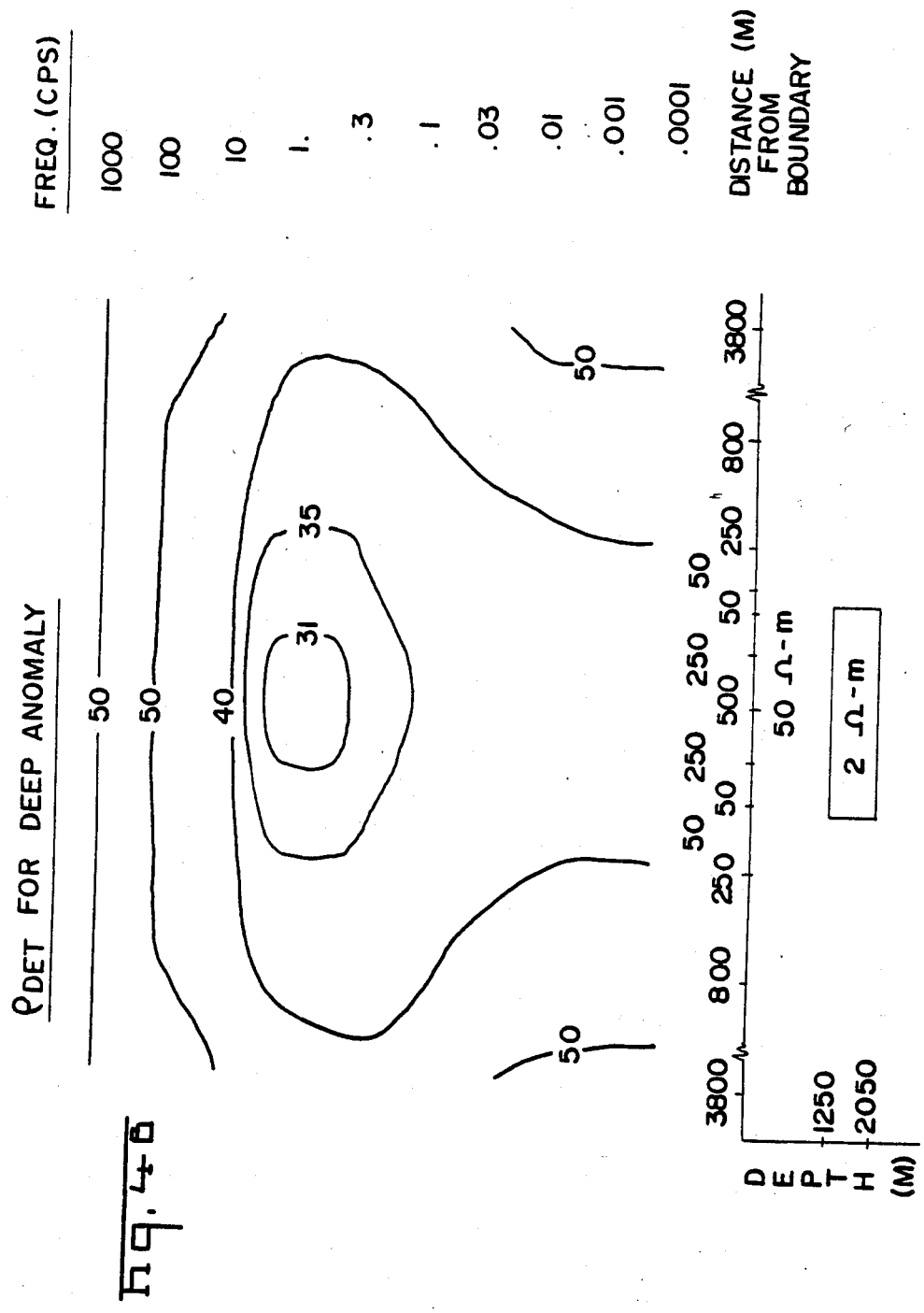

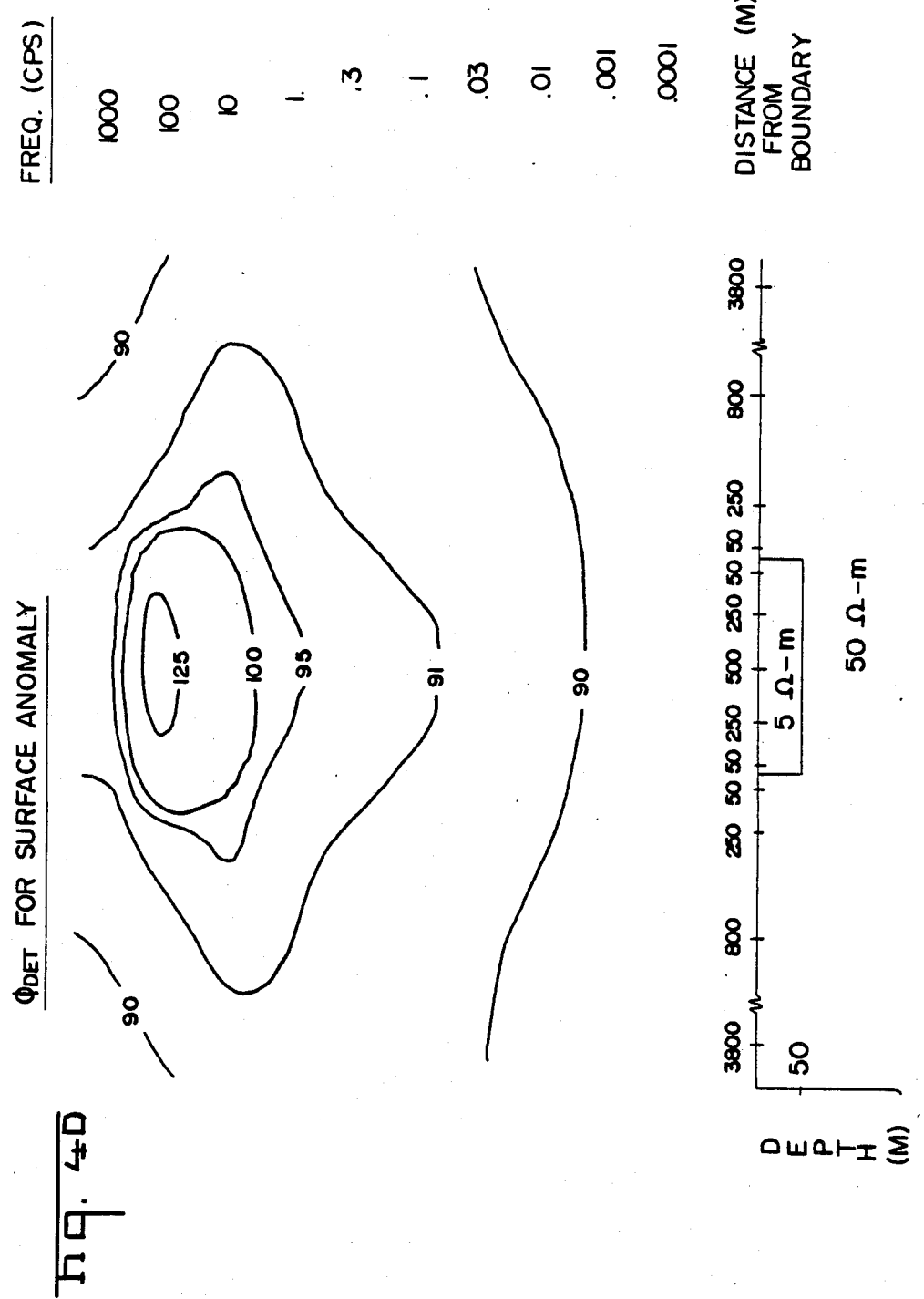

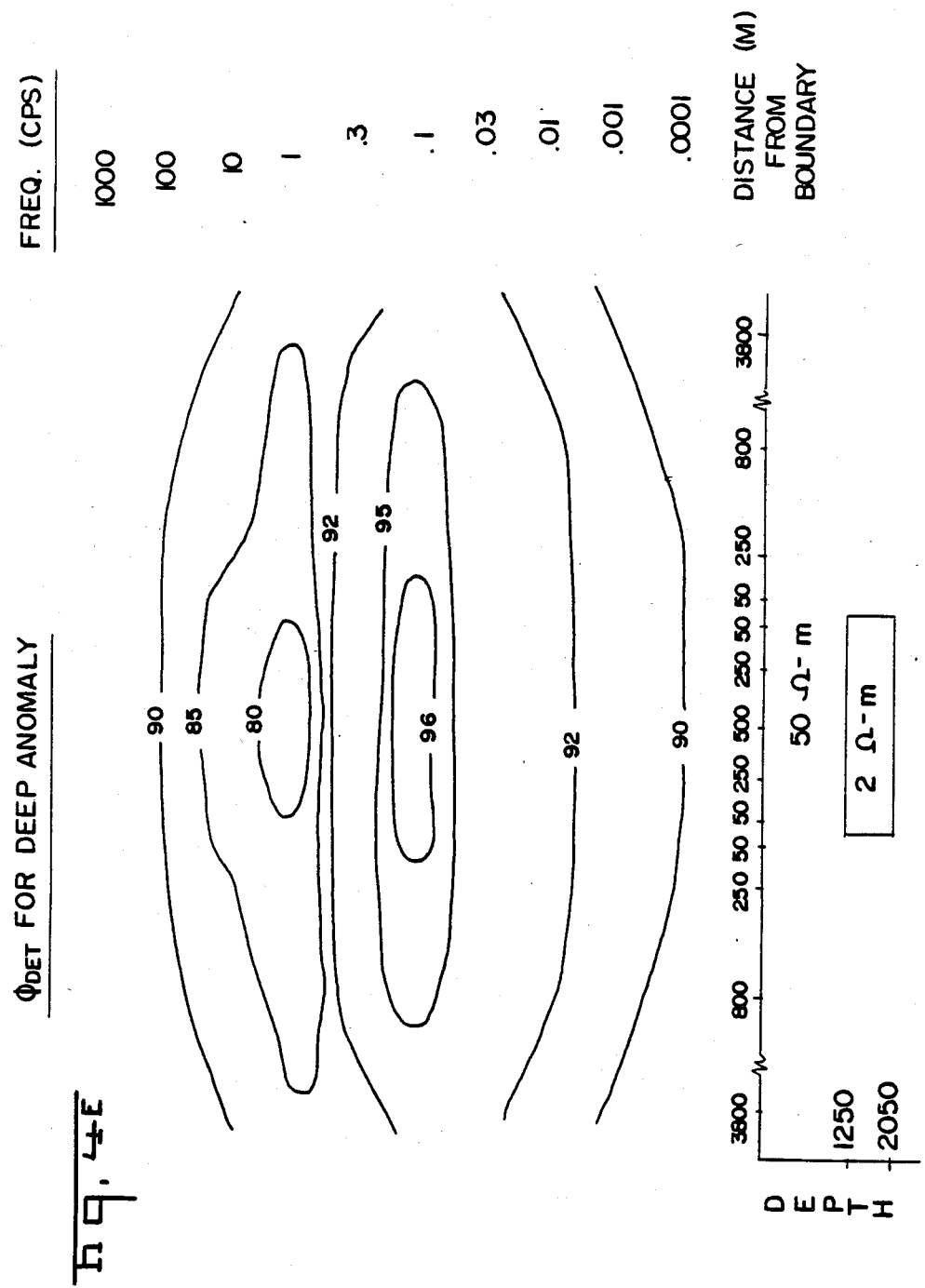

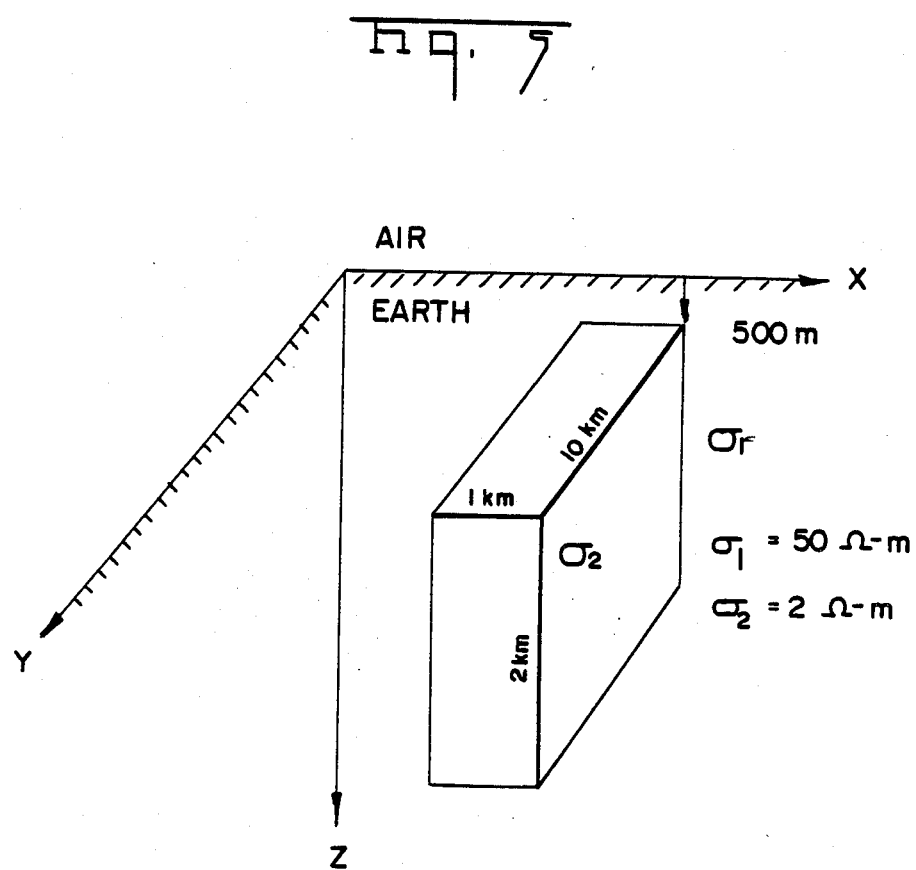

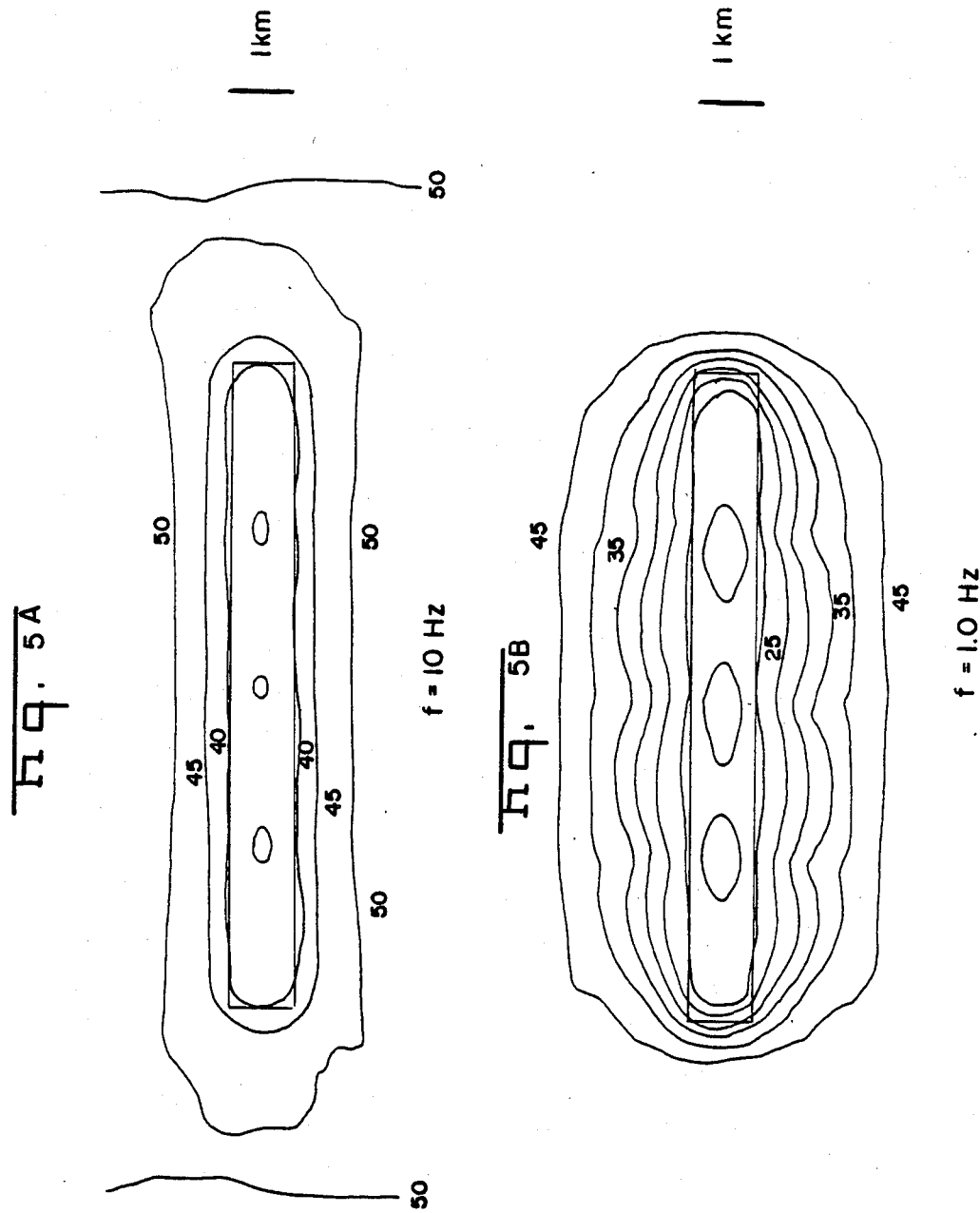

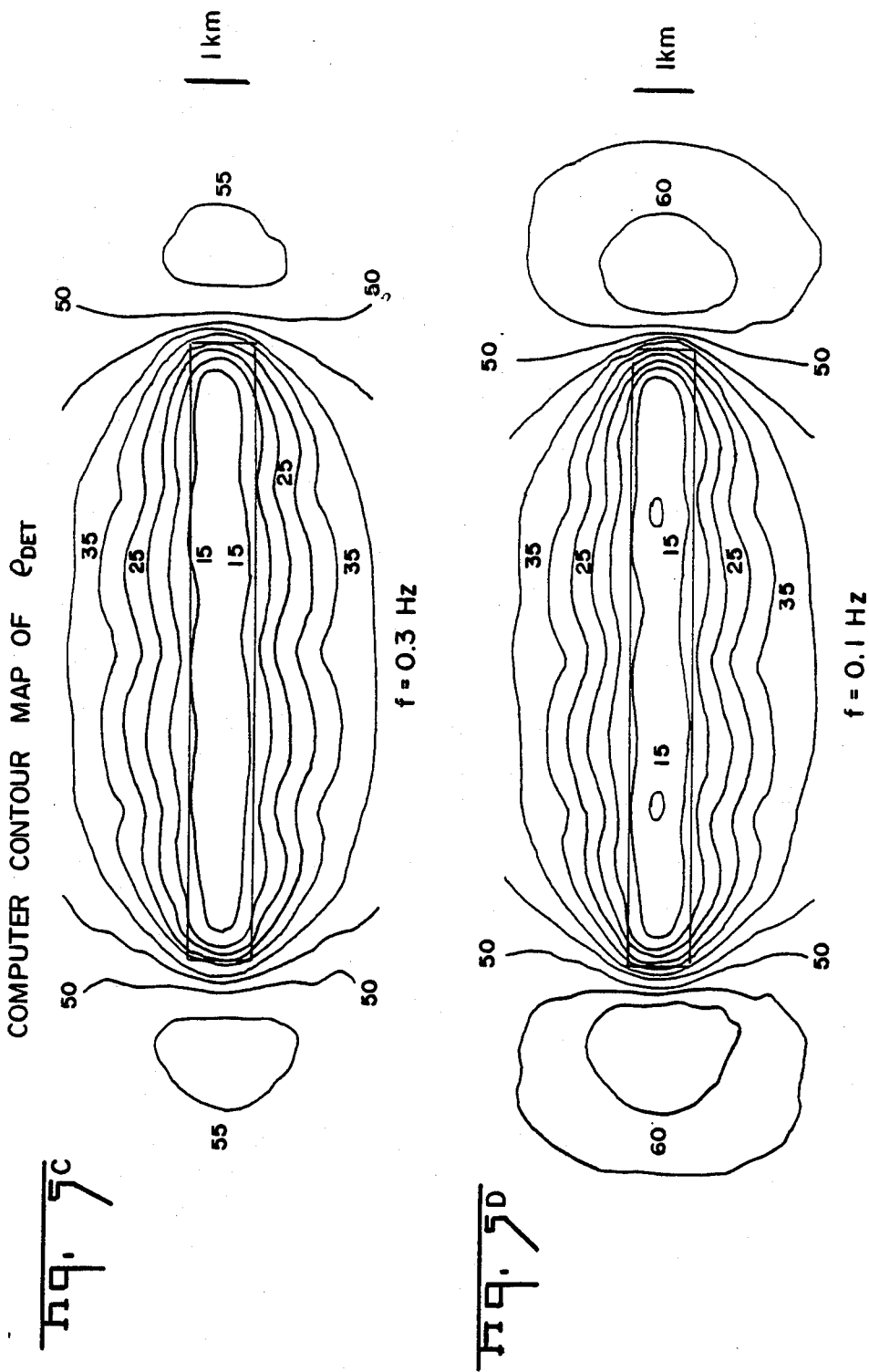

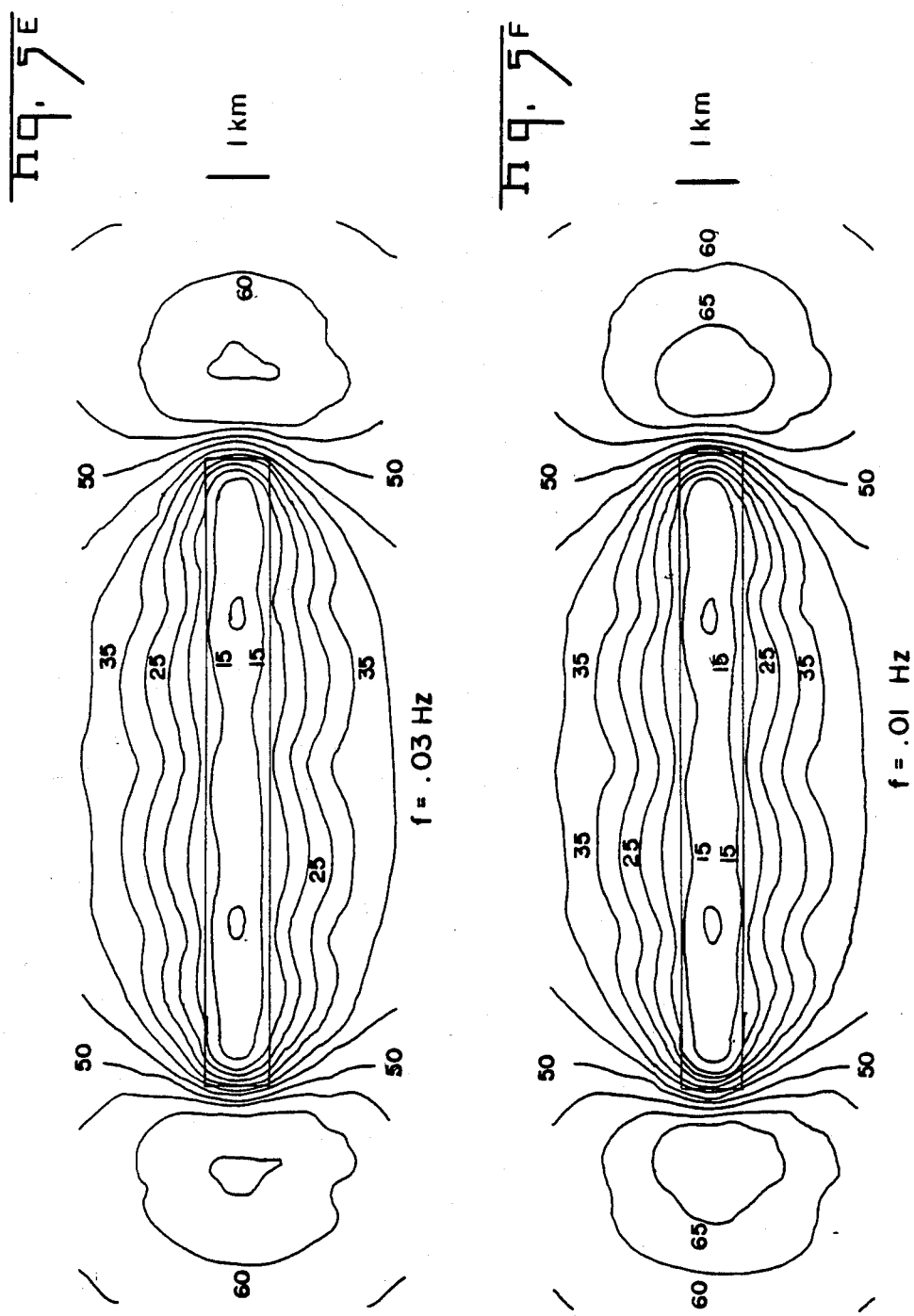

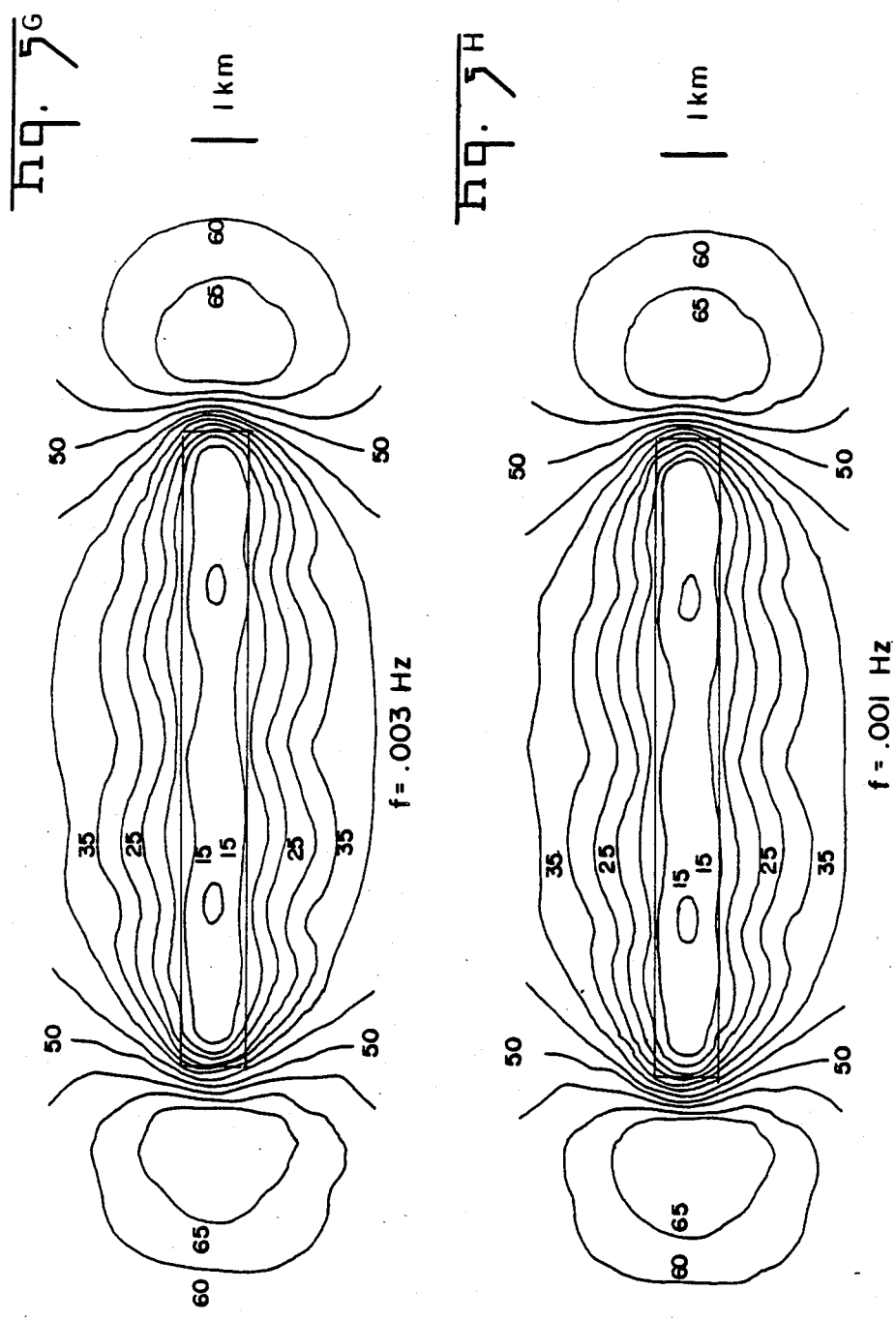

f = .0001 Hz

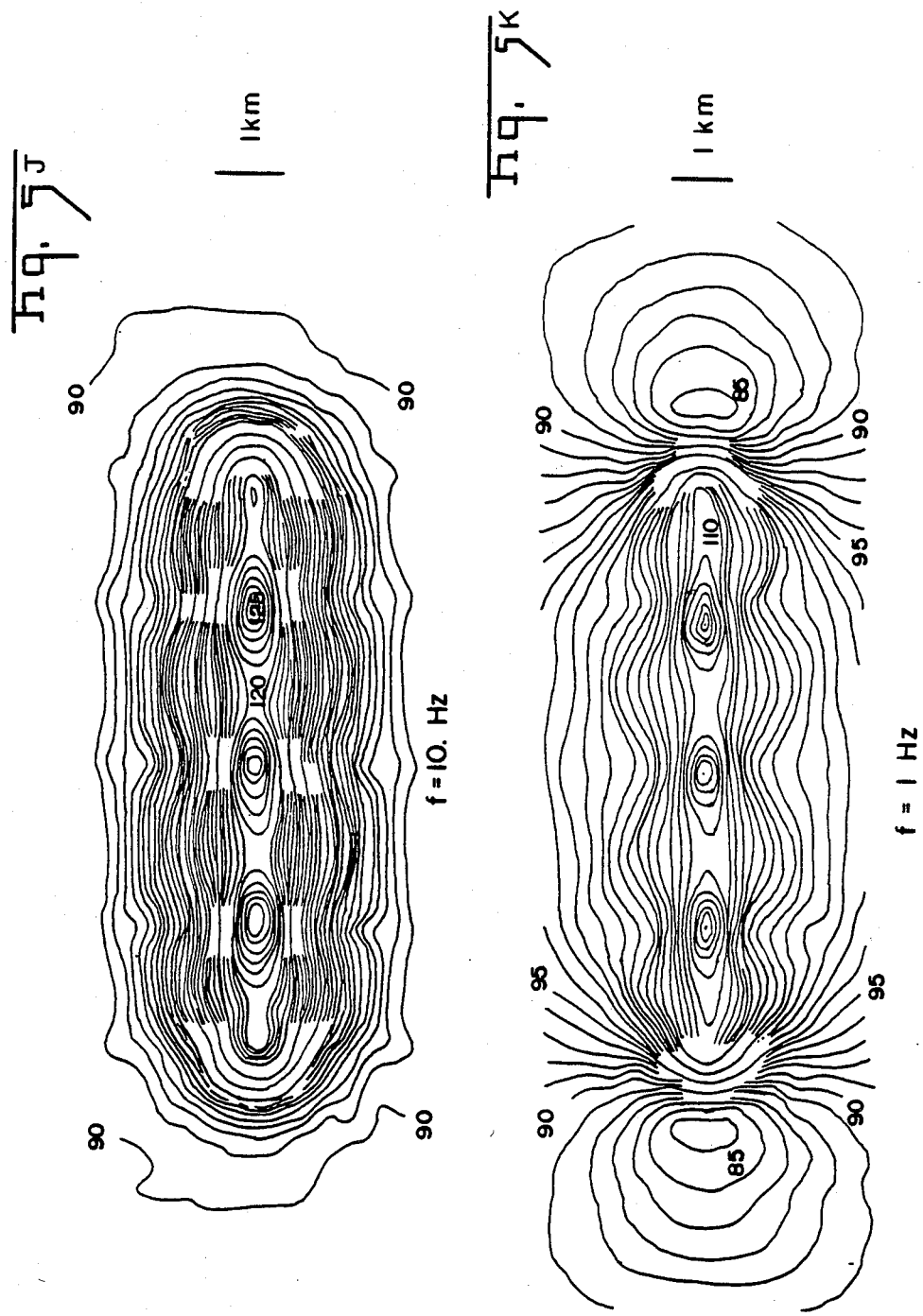

f = 0.3 Hz f = 0.1 Hz

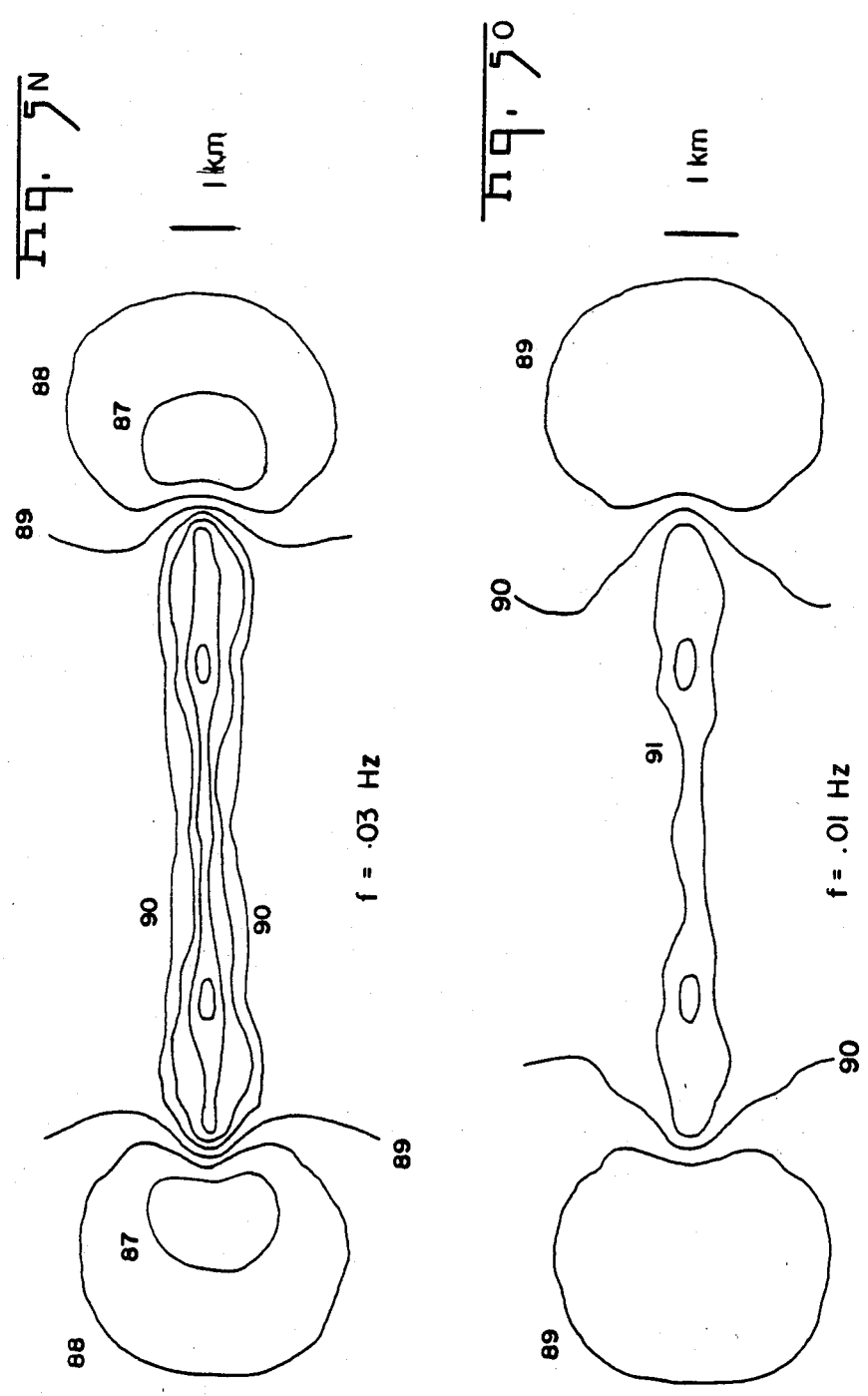

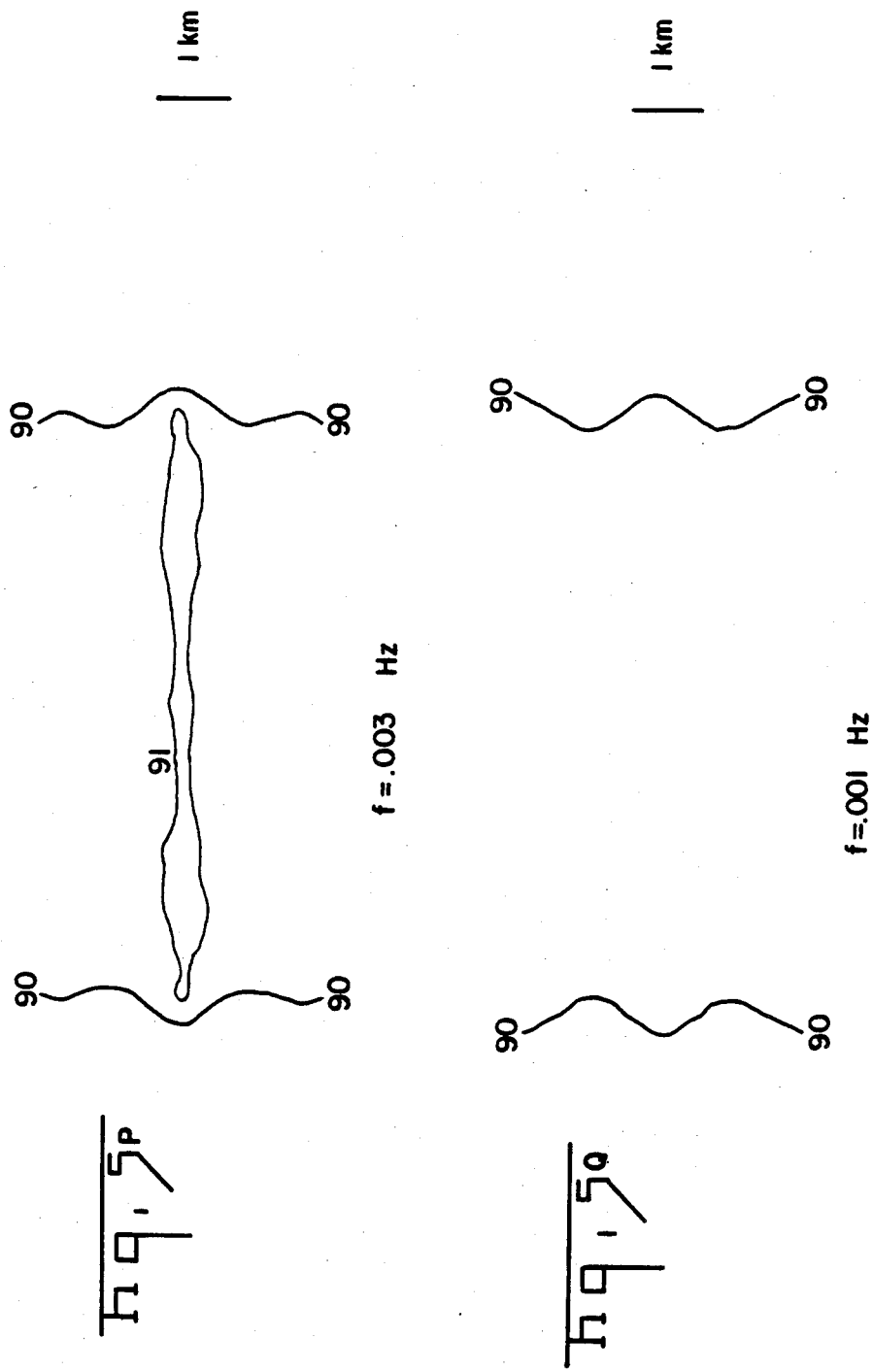

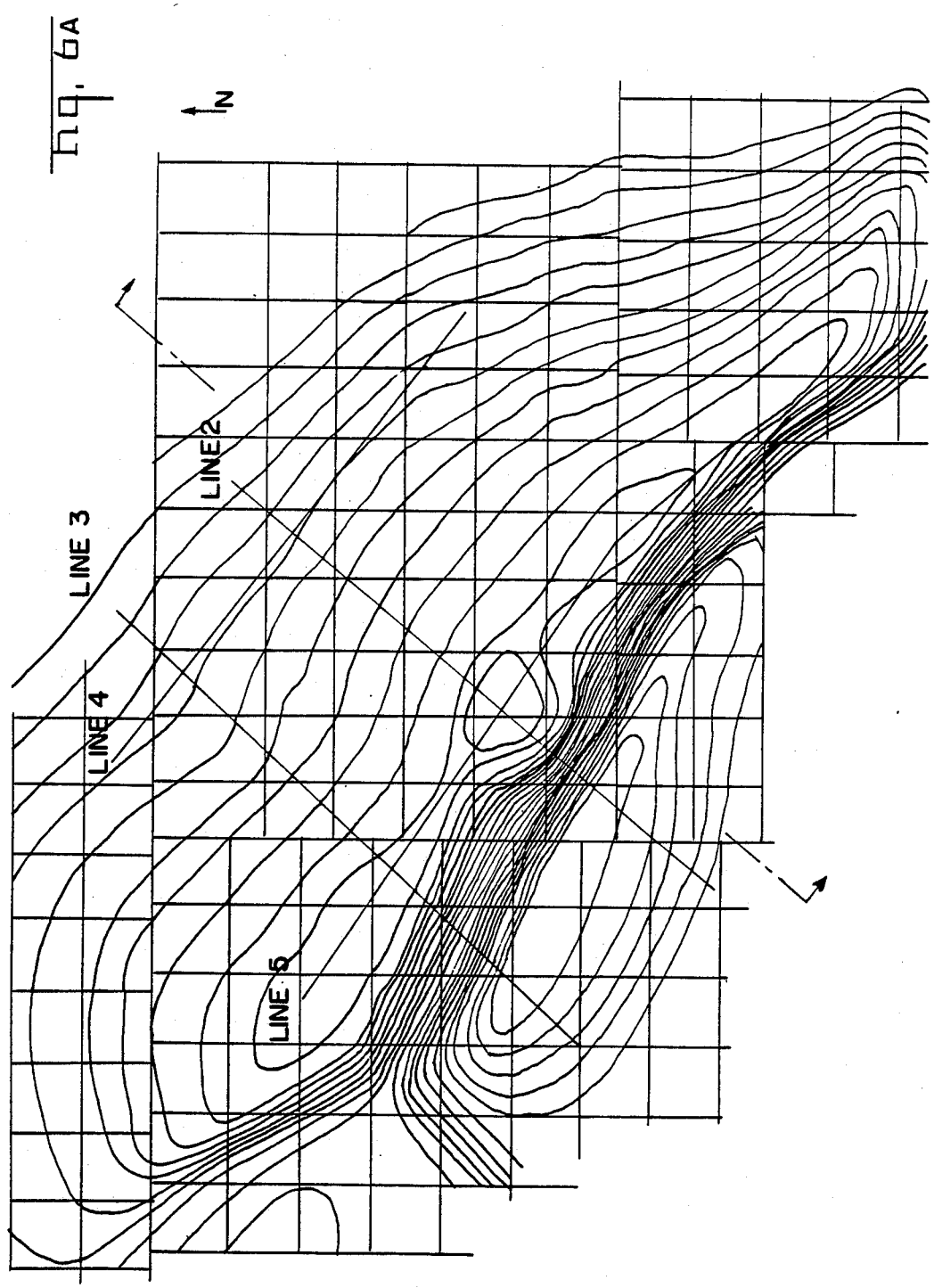

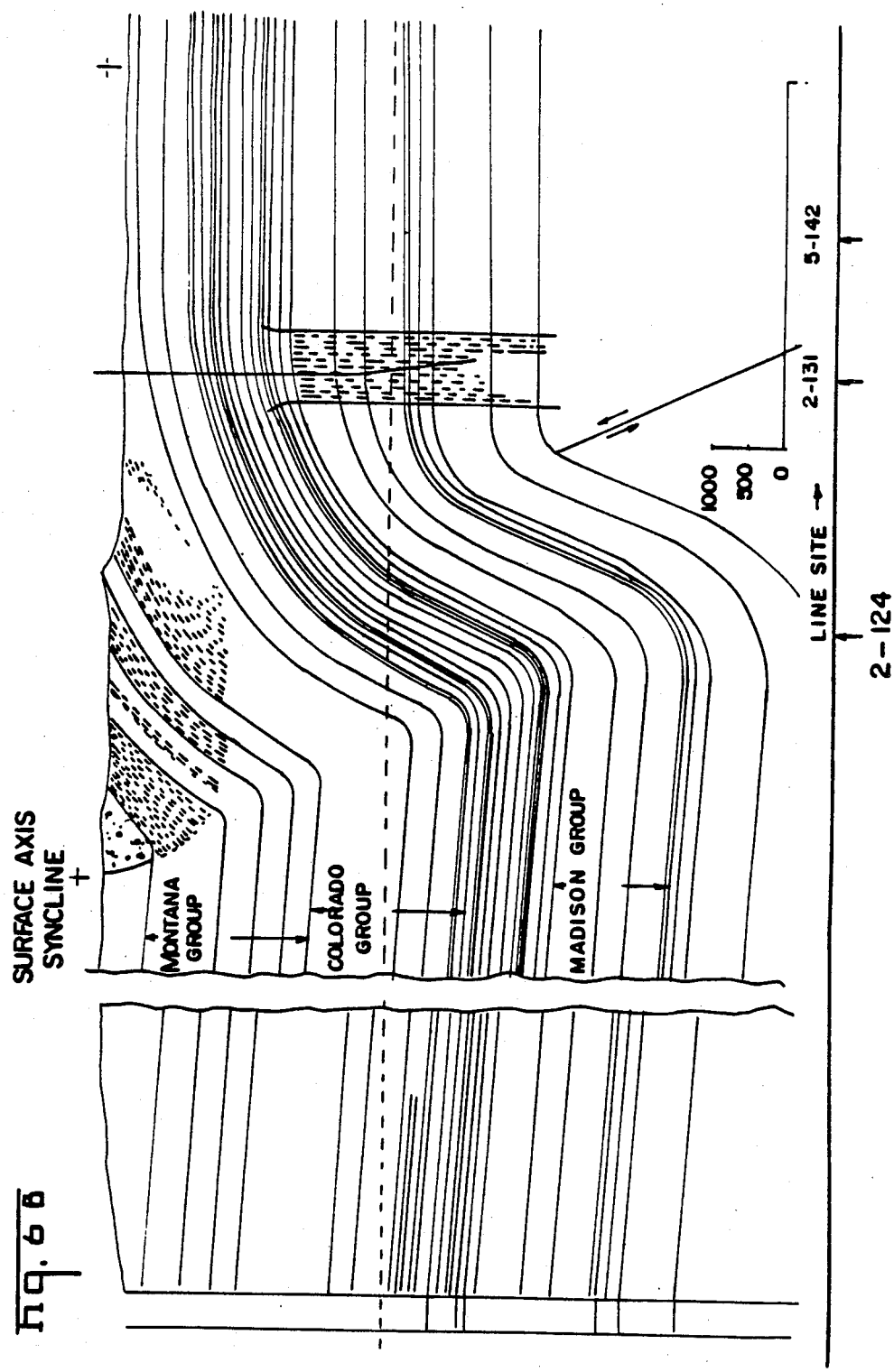

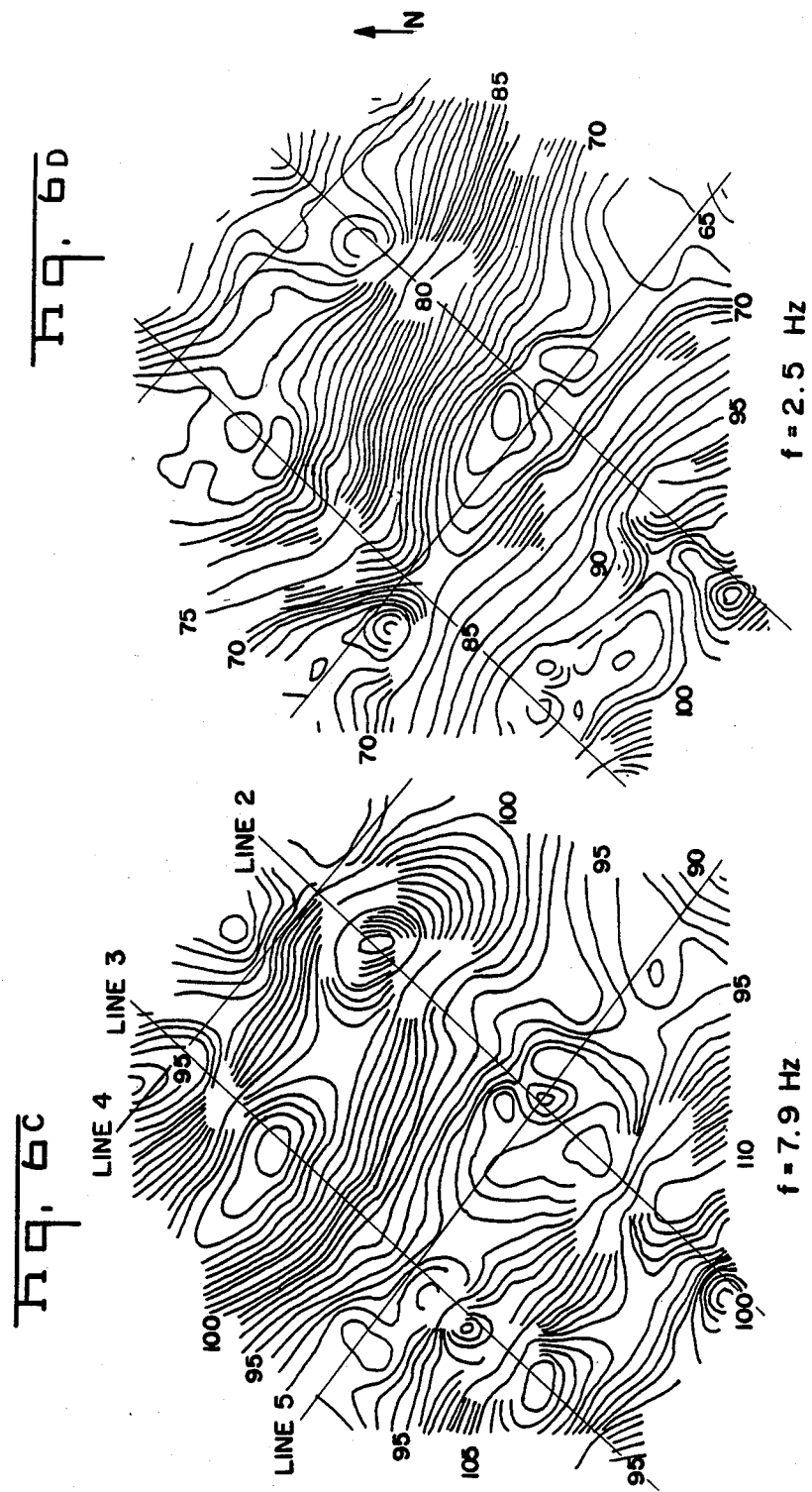

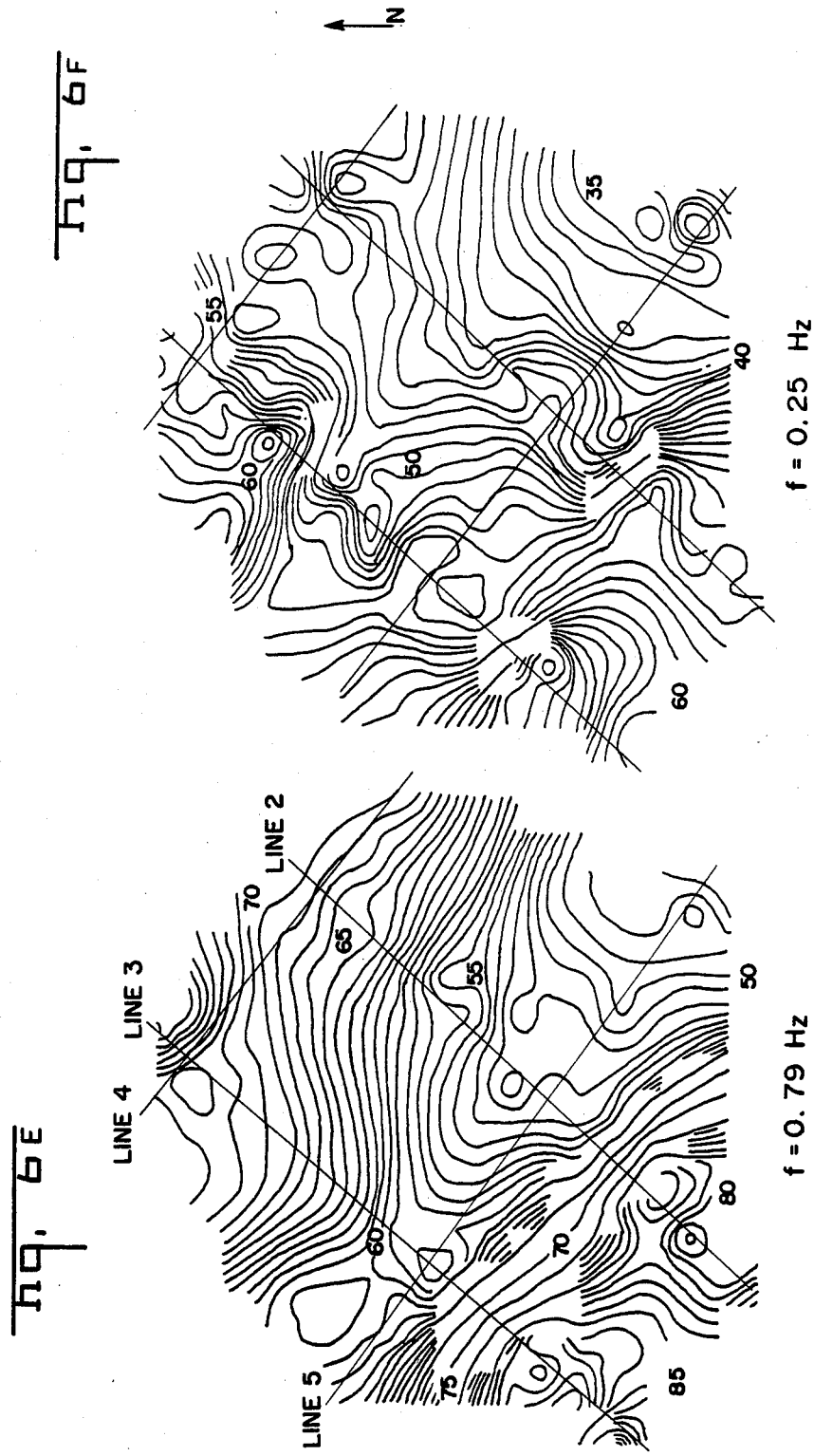

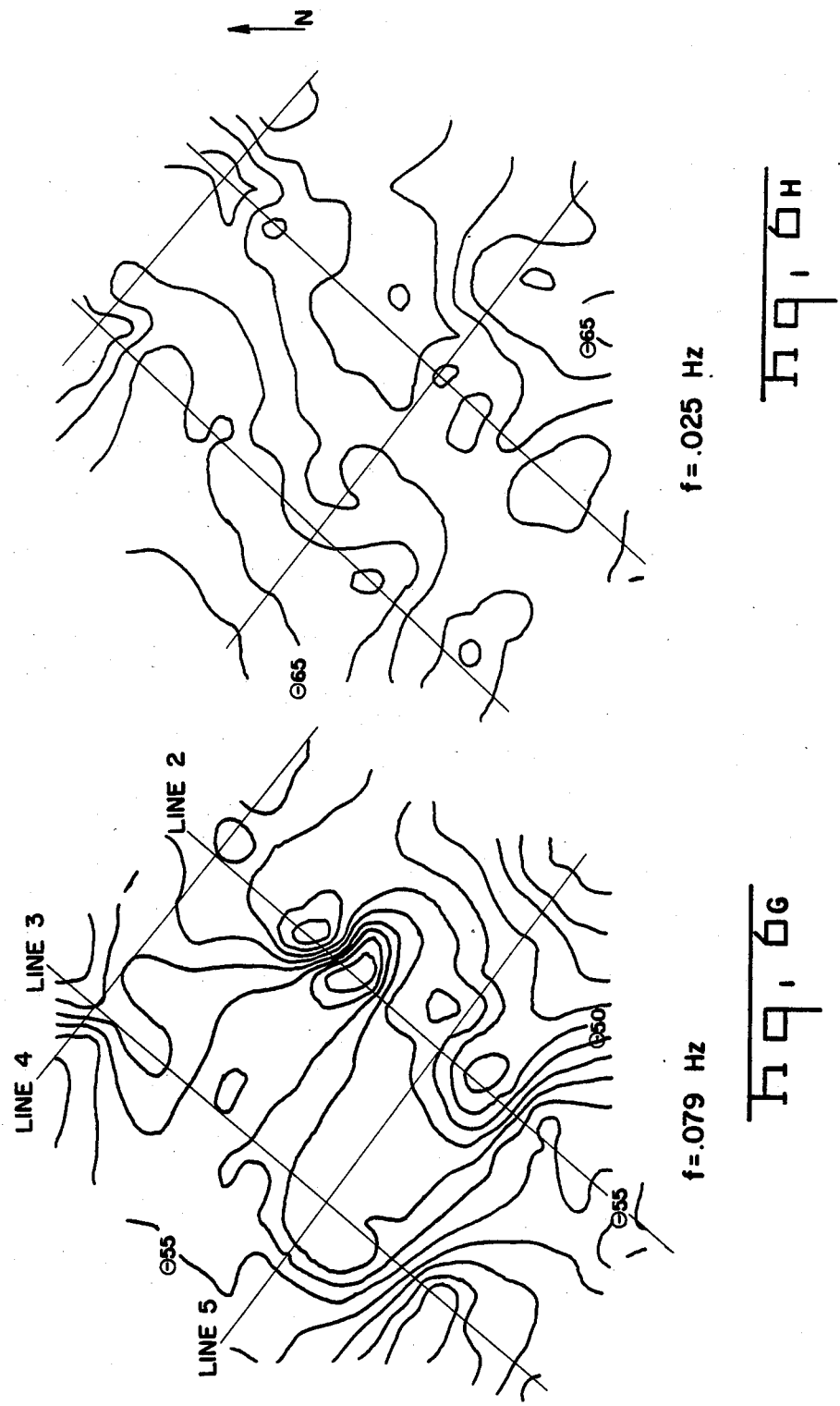

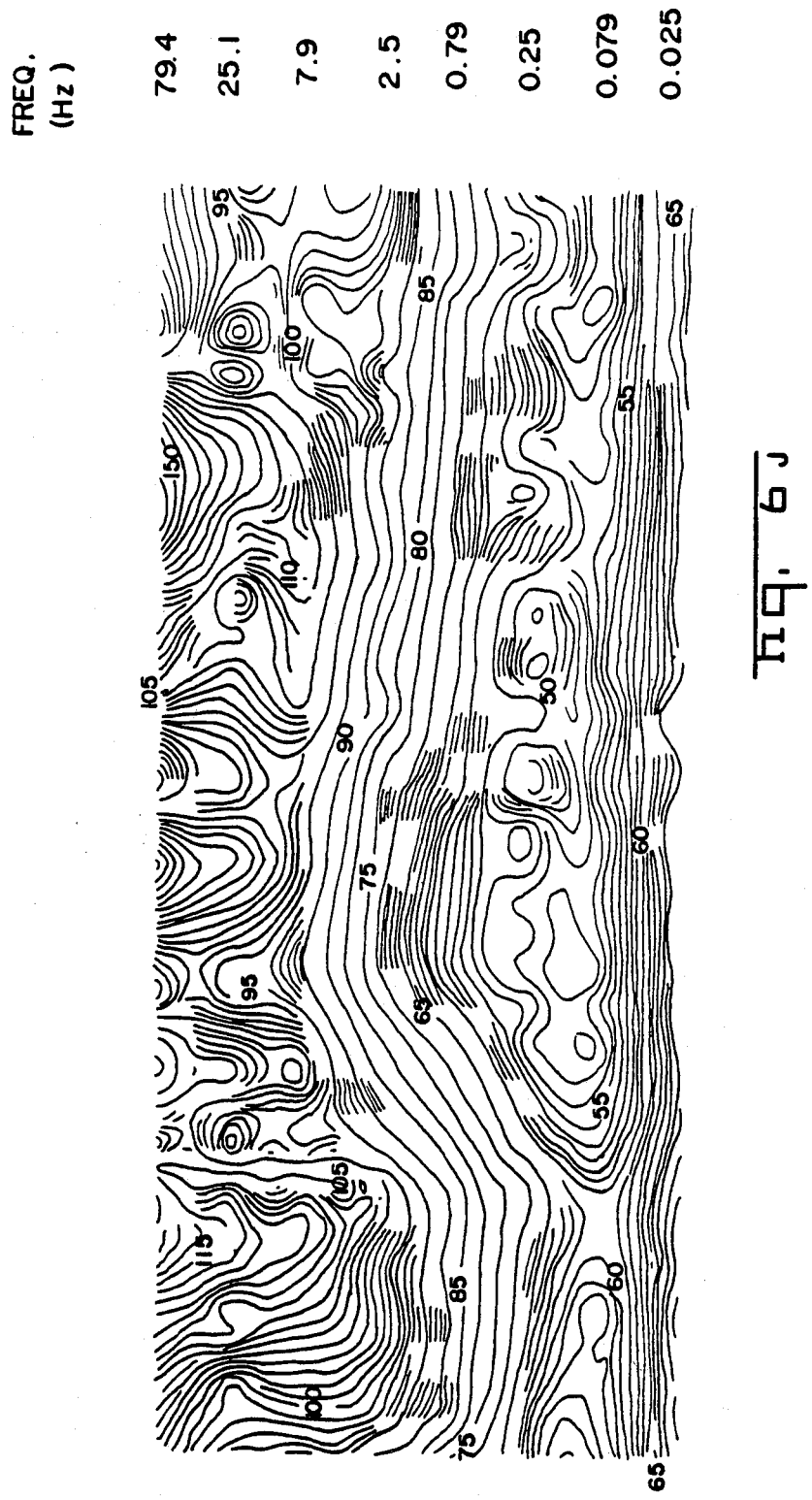

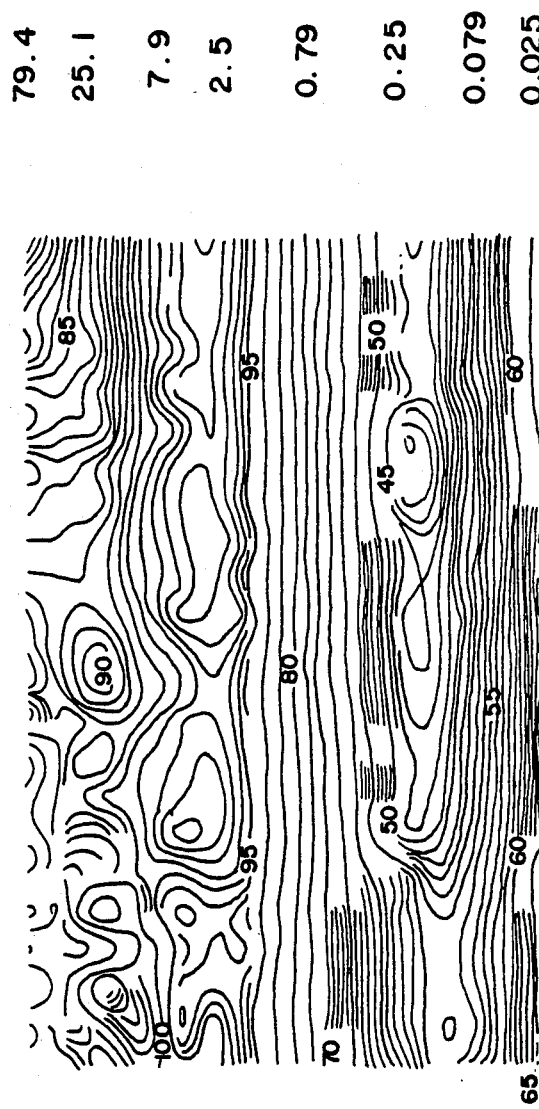

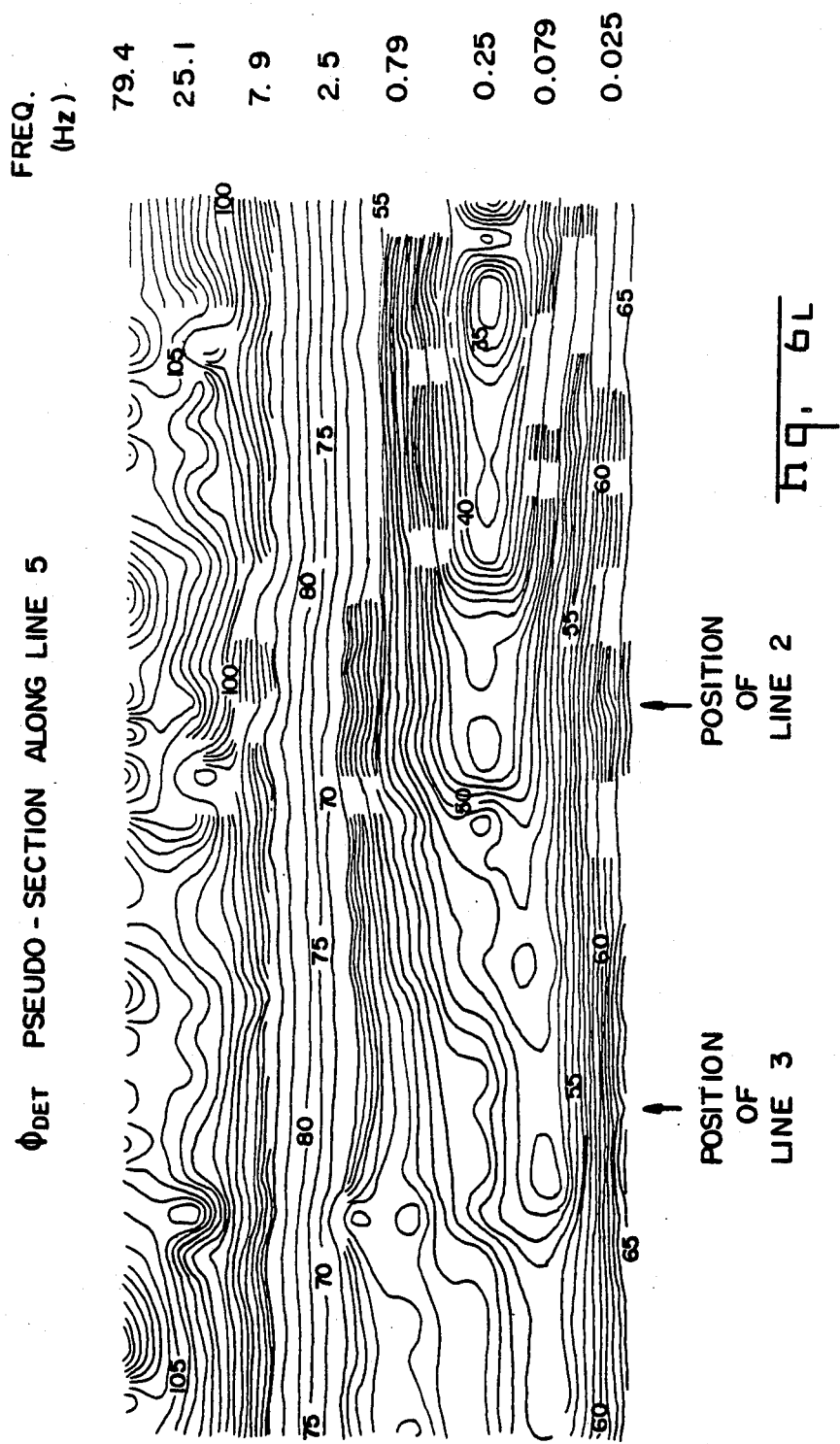

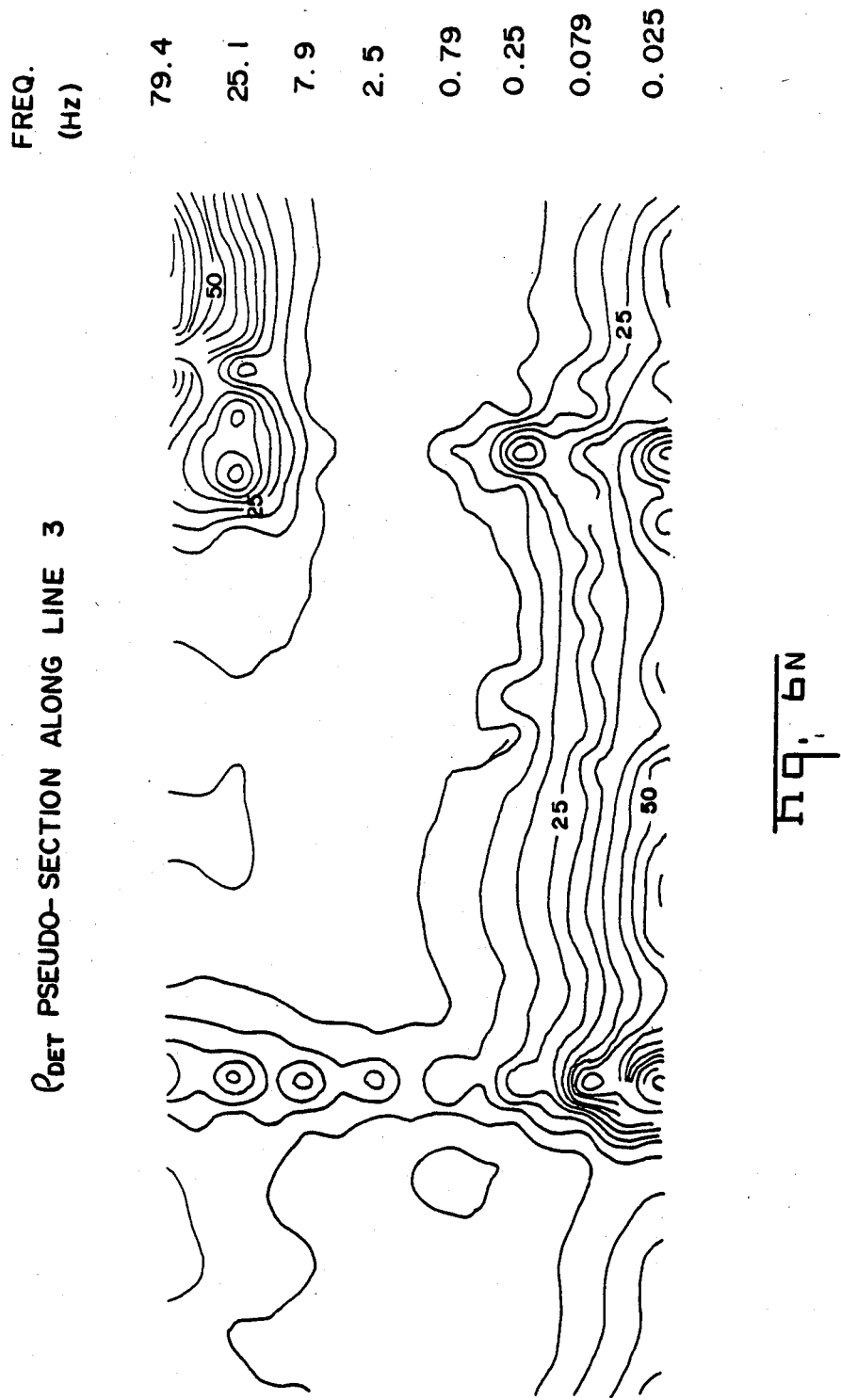

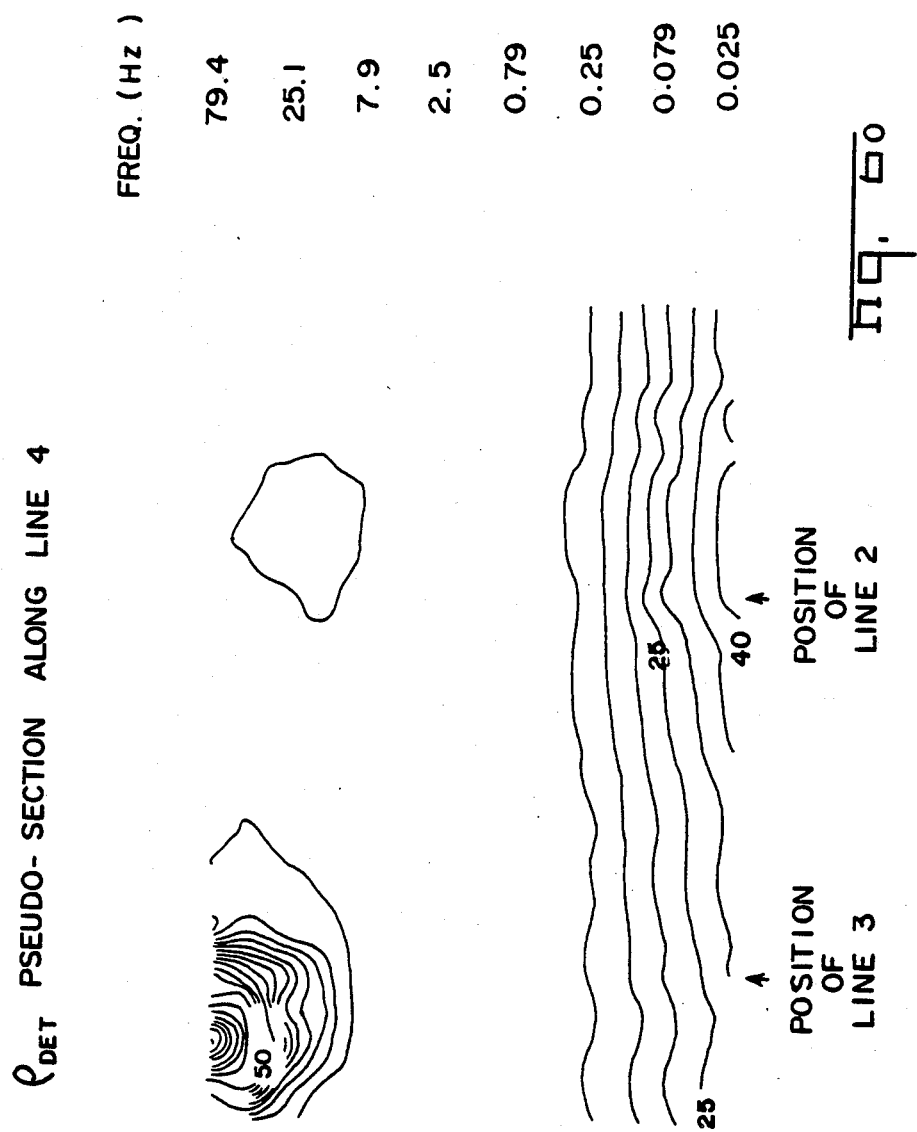

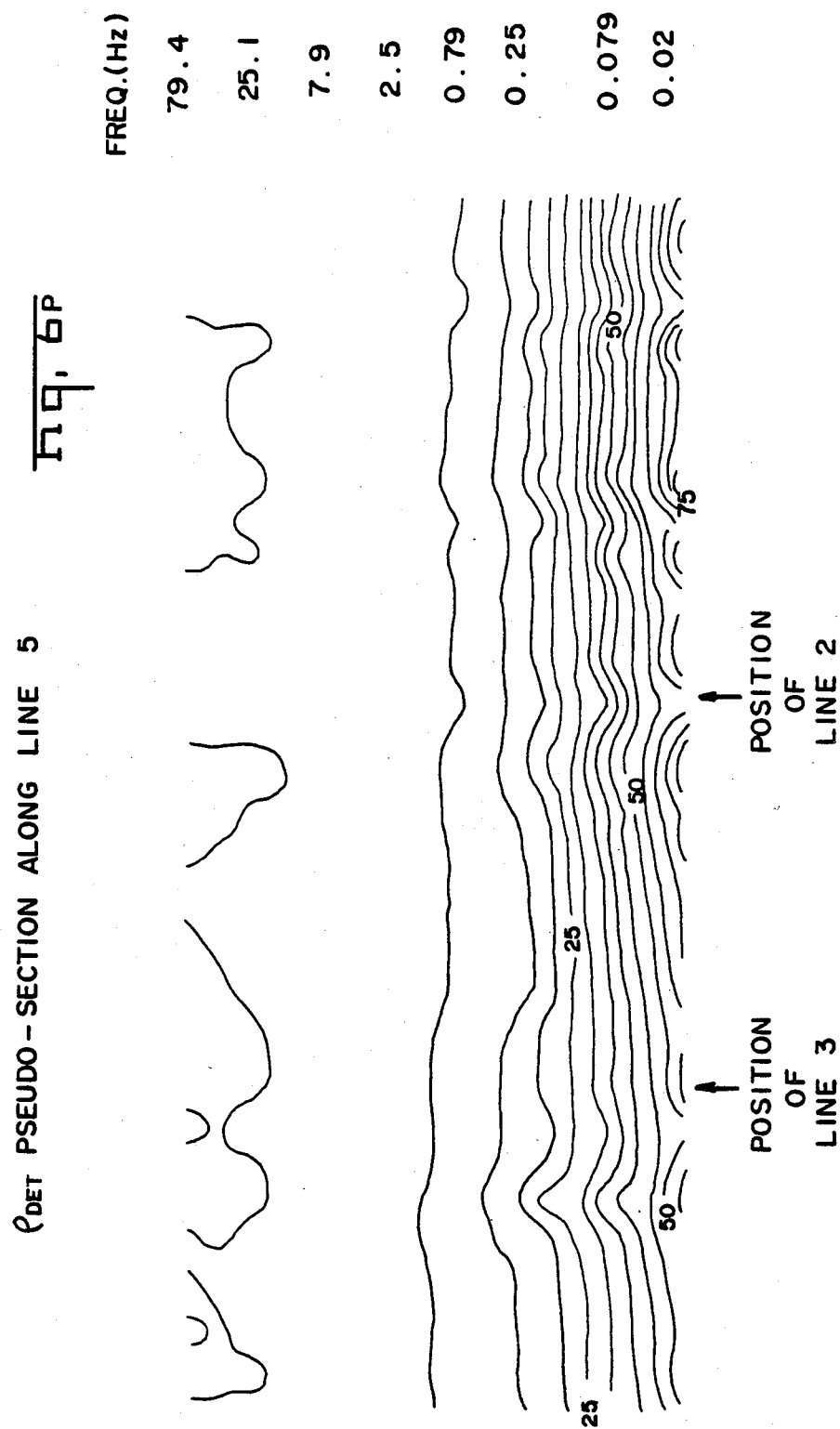

PLOTTING OF MAGNETOTELLURIC IMPEDANCE TO DETERMINE STRUCTURE AND RESISTIVITY VARIATION OF ANOMALIES

BACKGROUND OF THE INVENTION

This invention relates to magnetotelluric geophysical exploration, and more particularly, to plotting magnetotelluric impedances in a manner which makes them more useful.

It has long been known that telluric currents circulate beneath the surface of the earth. The prior art suggests that the measurement of these naturally occurring currents will indicate the resistivity of the earth and hence the geophysical characteristics of the subsurface. These telluric currents are subject to variations caused by external influences, such as sunspot activity. Because these variations are unpredictable, measurement of telluric currents was little used as a geophysical exploration tool until Louis Cagniard devised a mathematical technique capable of accounting for these variations. His work is represented, for example, in U.S. Pat. No. 2,677,801 wherein he proposes measuring not only the telluric currents, but also the magnetic field at a measurement station on the earth's surface. Cagniard teaches that a specific relationship exists between the measured orthogonal components of the earth's magnetic field and the measured orthogonal components of the earth's electric (or "telluric") field, and that spatial variations therein may be used to derive specific information regarding the subterranean structure of the earth. As certain structures are known to be indicative of the presence of minerals, these magnetotelluric measurements are a useful prospecting tool.

The Cagniard method of magnetotelluric exploration usually involves the measurement of signals representing the magnetic field and the electric field in two orthogonal directions, usually denoted by $H_x$, $H_y$, $E_x$ and $E_y$ respectively. In this type of exploration it is desirable to record the electric field and the magnetic field at spaced locations along a line of exploration.

"Multiple Site Magnetotelluric Measurements", U.S. Pat. No. 4,286,218 to Bloomquist, Hoehn, Norton and Warner, discloses a method of magnetotelluric exploration in which multiple measurements of the earth's electric field as a function of time are made at spaced locations on the earth's surface. One or more measurements the earth's magnetic field are made simultaneously .1d recorded.

The electric and magnetic field measurements in general are related to the impedance components of the earth in the following manner:

$$E_x = Z_{xx}H_x + Z_{xy}H_y$$

$$E_y = Z_{yx}H_x + Z_{yy}H_y$$

This may be expressed by the tensor relationship:

$$\begin{bmatrix} E_x \\ E_y \end{bmatrix} = \begin{bmatrix} Z_{xx} & Z_{xy} \\ Z_{yx} & Z_{yy} \end{bmatrix} \begin{bmatrix} H_x \\ H_y \end{bmatrix}$$

The impedances $Z_{xx}$ and $Z_{yy}$ arise because of the coupling of transverse electric and transverse magnetic fields by certain types of resistivity variation. The impedances $Z_{xy}$ and $Z_{yx}$ are referred to as the Cagniard impedance components. Analysis of the properties of the impedance tensor shows that it is direction dependent. It is possible to determine the dimensionality of the resistivity variation and this information is extremely useful. It is important to determine the dimensions of resistivity variation, because interpreting a two dimensional variation as one dimensional or a three dimensional variation as two dimensional often leads to large errors in the predicted resistivity values. See Ranganayaki, R. P. and Madden, T. R., 1980, "Generalized Thin Sheet Analysis in Magnetotellurics: An Extension of Price's Analysis," Geophysical J. R. Astr. Soc., Vol. 60, pp. 445–457, and Ting S. C., and Hohmann, G. W., 1981, "Integral Equation Modeling of Three-Dimensional Magnetotelluric Response", Geophysics, Vol. 46, No. 2, pp. 182–197.

The prior art has described a way by which the dimensionality of the resistivity variation can be determined. Amplitude polar diagrams of $Z_{xy}$ (or $Z_{yx}$) and $Z_{xx}$ ($Z_{yy}$) are described in Reddy, I. K., Rankin, D., and Phillips, R. J., 1977, "Three-Dimensional Modeling in Magnetotelluric and Magnetic Variational Sounding", Geophy. J.R. Astr. Soc., Vol. 51, pp. 313–325, and in the aforementioned Ting and Hohmann 1981 articles. For one dimensional variation, the amplitude of $Z_{xx}$ ($Z_{yy}$) is zero and $Z_{xy}$ ($Z_{yx}$) is circular because it has the same magnitude in all directions. For two dimensional variation $Z_{xy}$ ($Z_{yx}$) has a maximum or minimum parallel or perpendicular to the strike and $Z_{xx}$ ($Z_{yy}$) is symmetric about the strike direction. For three dimensional variation the magnitude $Z_{xx}$ ($Z_{yy}$) is no longer symmetric. Either it is assymetric or is a curve that does not go to zero in any direction.

In accordance with the present invention, another method is based on the properties of the impedance tensor as described in Word, D. R., Smith, H. W., and Bostick, F. X. Jr., 1970, "An Investigation of the Magnetotelluric Tensor Impedance Method", EGRL Tech. Rep. No. 82, Univ. of Texas at Austin. Sims, W. E., 1969, "Methods of Magnetotelluric Analysis", Ph.D. Dissertation, The Univ. of Texas—January, 1969, shows that the loci of impedance tensor elements in the complex plane as a function of rotation angle are in general ellipses of the same dimensions and orientations centered at $$Z_1 = \frac{Z_{xy} - Z_{yx}}{2} \text{ and } Z_2 = \frac{Z_{xx} + Z_{yy}}{2}.$$

$Z_1$ and $Z_2$ are invariant under rotation. The shape of the rotation loci depends upon the resistivity variation at the measurement site. If the resistivity variation is three dimensional, the surface impedance loci are ellipses; for two dimensional resistivity variations, the loci reduce to straight lines, i.e., the minor axis of the rotational ellipse goes to zero. If the resistivity variation is one dimensional, the locus reduces to a point in the complex plane, i.e., in this case, even the major axis of the ellipse goes to zero. This is explained in the aforementioned Word, et al. article.

Another problem is interpreting magnetotelluric data is that a resistivity anomaly near the surface affects measurements at greater and greater distances as the frequency decreases. Because of this, a low frequency effect measured at any point could be caused by either a lateral variation in resistivity near the surface or a variation at depth. Phase polar diagrams have been used to reduce this ambiguity and to help in determining the depth of an anomaly. The amplitude polar diagrams discussed above respond mostly to the near surface anomaly and are therefore, not particularly useful in delineating deeper anomalies in the presence of a near surface anomaly. Amplitude polar diagrams, once affected by an anomaly, remain affected for a considerable part of the frequency spectrum.

It is an object of the present invention to plot magnetotelluric measurements in a manner in which the structure and resistivity variation of an anomaly can be easily interpreted.

RELATED APPLICATIONS

"Method of Displaying Magnetotelluric Data," Ser. No. 196,000, filed Oct. 10, 1980 and now abandoned Barry N. Warner, describes a method of displaying contours of equal value of resistivity. The resistivity, and phase, plotted therein is not dependent on dimensionality. "Static Correction for Magnetotelluric Data," U.S. Pat. No. 4,392,109 to B. H. Warner describes a method for processing magnetotelluric measurements to remove the effects of near surface anomalies.

SUMMARY OF THE INVENTION

In accordance with the present invention, magnetotelluric measurements are plotted in a manner from which the interpreter can easily discern the structure and relative resistivity of an anomaly. This is accomplished by plotting contours of equal values of the phase of the determinant of the components of the impedance tensor relating electric and magnetic field measurements of the earth. These equal values of phase are plotted as a function of distance on the line of exploration on which the measurements were made. The contours are plotted for successively lower frequencies, thereby delineating the resistivity variation with depth.

Further in accordance with the invention, a function of the magnitude of the determinant of the aforementioned tensor components is plotted as a function of the points on the line of exploration at which the measurements were made. Again, plots are made at successively lower frequencies which represent successively deeper depths in the earth.

In this manner, four complex impedance components are represented by two plots of the phase and magnitude of the determinant of the tensor components. These plots are easily interpreted to show the structure of a resistivity anomaly. This is an important tool which can be used by geophysicists and geologists to determine the location and nature of the subsurface formations.

The plots of the present invention display the dimensionality of the anomaly by contouring the anomaly. Furthermore, by plotting the phase of the determinant, the anomaly at depth is displayed better. The phase of impedance is affected only in the frequency range in which the effective skindepth is of the same order as the depth of the anomaly. That is, near surface anomalies cause phase variation in higher frequencies and none in low frequencies, while a deep anomaly cause phase changes only in the low frequency impedance measurements.

The foregoing and other objects, features and advantages will be better understood from the following more detailed description and appended claims.

SHORT DESCRIPTION OF THE DRAWINGS

FIG. 3 is a flow chart depicting the invention;

FIGS. 4A–4C are plots of $\rho_{DET}$ for a surface anomaly, a deep anomaly, and a surface and deep anomaly, respectively;

FIGS. 4D–4F are plots of $\phi_{DET}$ for a surface anomaly, a deep anomaly, and a surface and deep anomaly, respectively;

FIG. 5 depicts a model three-dimensional resistivity anomaly;

FIGS. 5A–5I are computer contour maps of $\rho_{DET}$ for the anomaly of FIG. 5 for different frequencies of measurement;

FIGS. 5J–5Q are computer contour maps of $\phi_{DET}$ for the anomaly of FIG. 5 for different frequencies;

FIG. 6A is a structure contour map of a site from which actual magnetotelluric measurements were made;

FIG. 6B is a geologic structure cross-section of the area of FIG. 6A along line 2;

FIGS. 6C–6H are contour maps of $\phi_{DET}$ for the measurements from the area depicted in FIG. 6A for different frequencies;

FIGS. 6I–6L show $\phi_{DET}$ for sections along different lines of exploration of the area depicted in FIG. 6; and FIGS. 6M–6P show $\rho_{DET}$ in sections along different lins of exploration shown in FIG. 6A.

DESCRIPTION OF THE PREFERRED EMBODIMENT

Figure 1A:
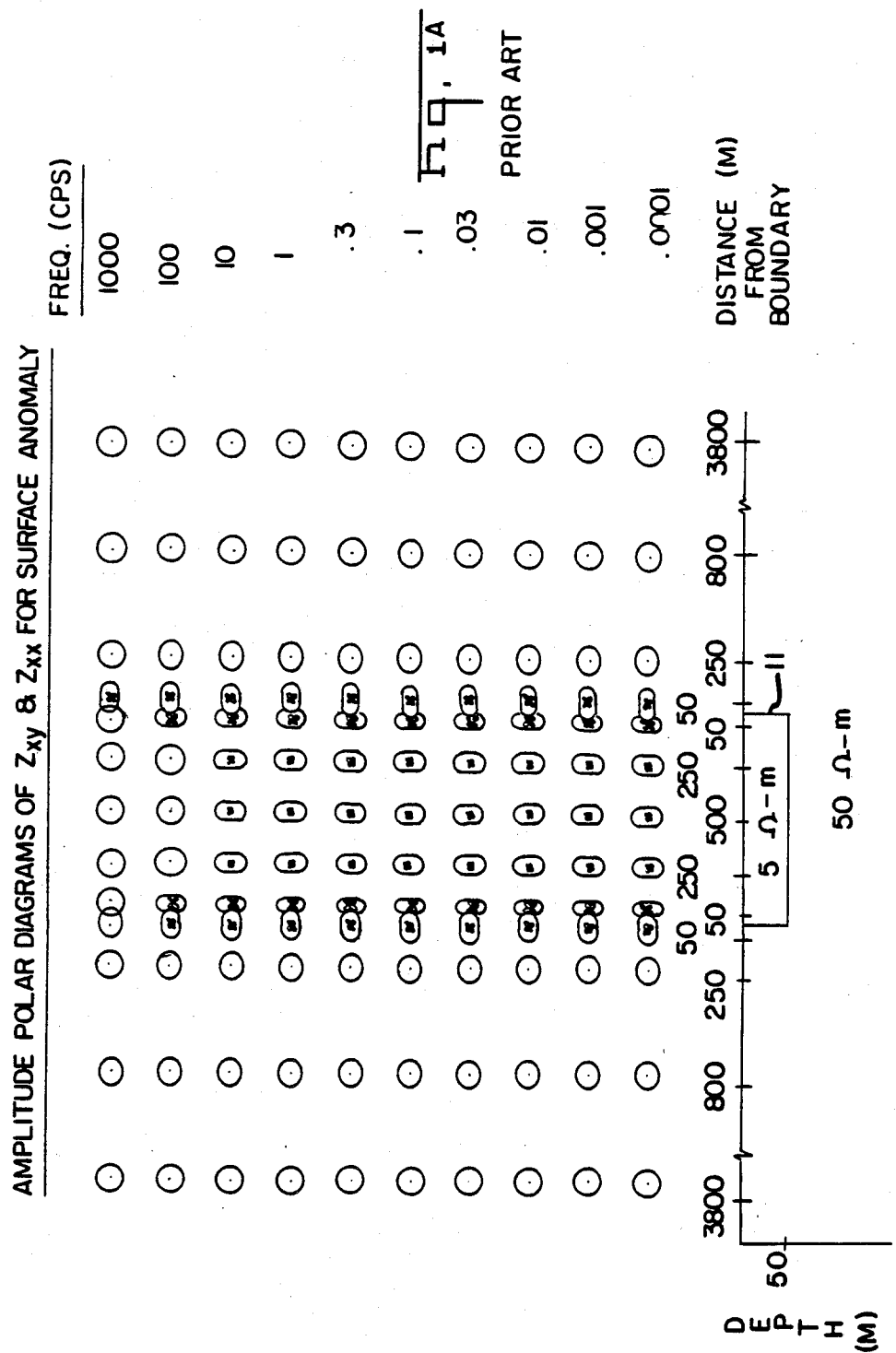
FIGS. 1A–1C are amplitude polar diagrams of the type described in the prior art.
Figure 1B:
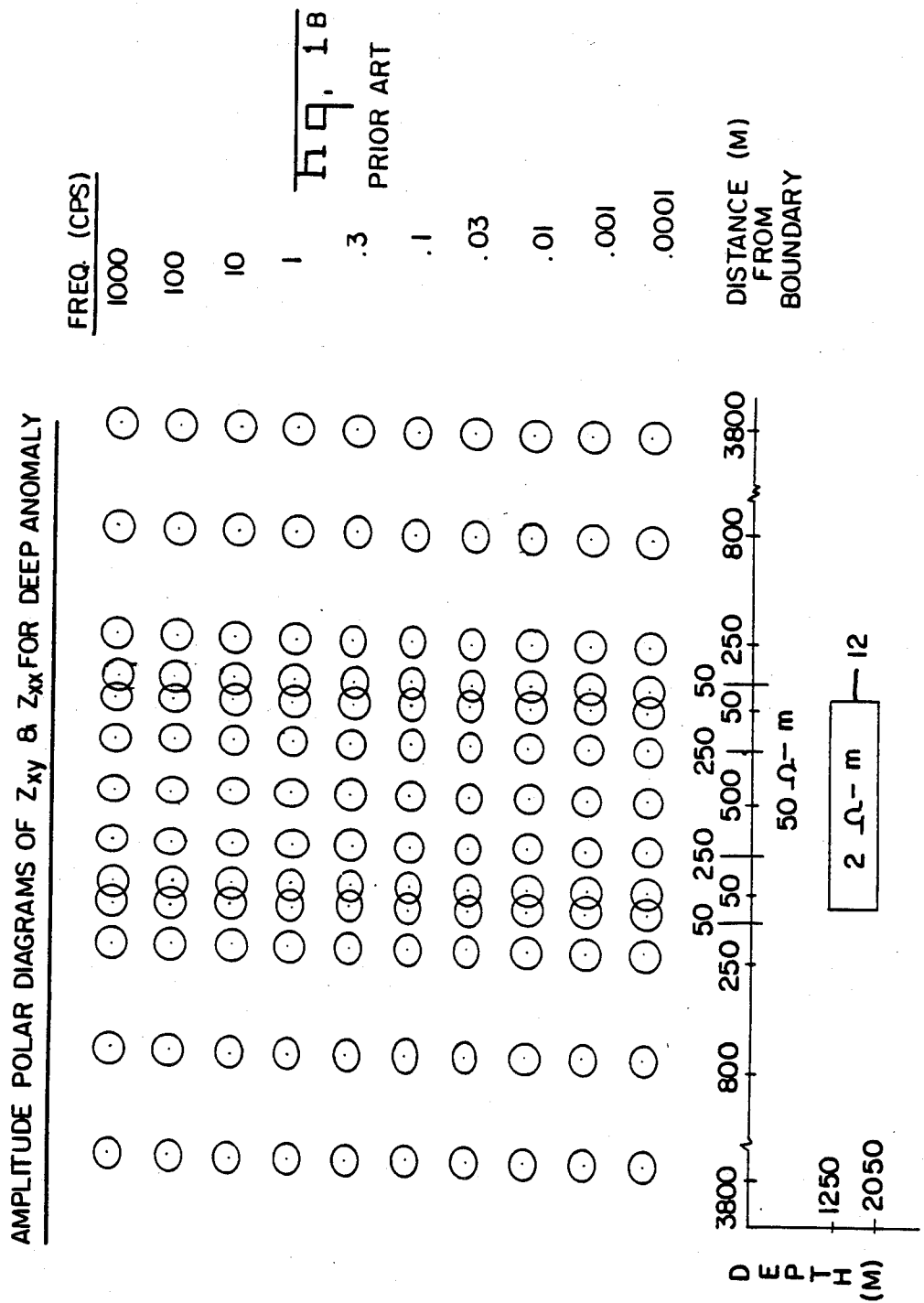
Figure 1C:
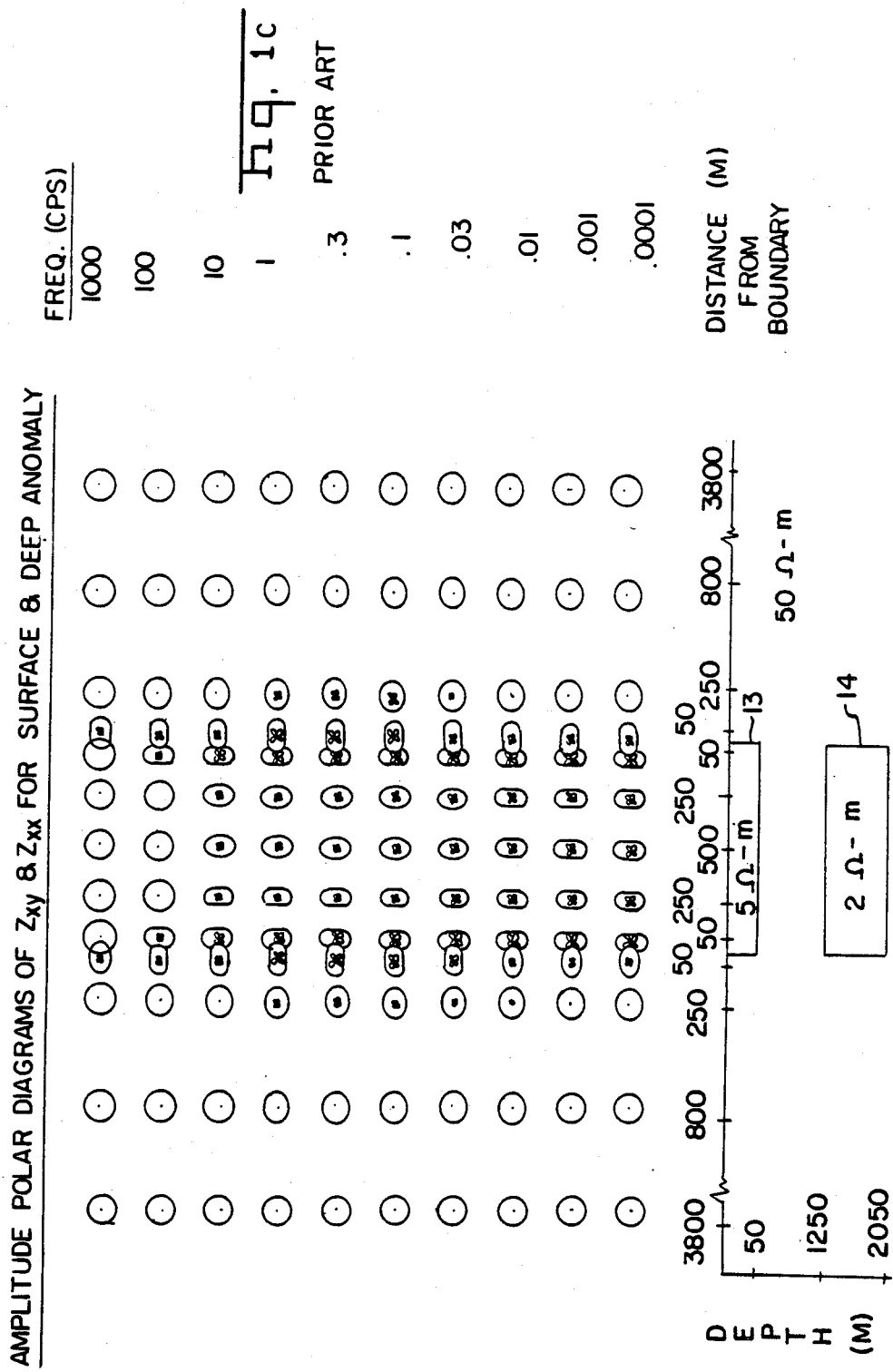

Before proceeding to a description of the invention, it will be helpful in understanding it to review the prior art of plotting amplitude polar diagrams of the earth's complex impedance components as determined from magnetotelluric measurements. FIGS. 1A–1C are amplitude polar diagrams produced in the manner taught by the aforementioned prior art. The bottom of each Figure depicts the model from which the diagrams were derived. At the bottom of FIG. 1A, a 5 ohm meter surface anoamly 11 is in a 50 ohm meter background. The amplitude polar diagrams in FIG. 1A are plots of $Z_{xy}$ and $Z_{xx}$ (y being parallel to the strike) with successively decreasing values of frequency being shown as the ordinate. The polar diagrams on both sides of the area representing the anomaly are circular. Approaching the boundary of the anomaly, the polar diagrams become elliptical. On crossing the boundary, the ellipticity flips by 90° to become vertical. This shows that on one side of the boundary, the impedance component being plotted had a maximum and on the other side a minimum. Since the impedance component was $Z_{xy}$, this shows that the anomaly was a conductive anomaly. In this manner, amplitude polar diagrams provide information which delineate the boundaries of near surface anomalies and the nature of the anomaly.

In FIG. 1B the anomaly is a 2 ohm meter plug 12 buried in a 50 ohm meter background. At high frequencies (the shallow depths) the polar diagrams are circular, while at intermediate frequencies (lower depths), the diagrams become elliptical, thus truly indicating that the anomaly is at depth.

These amplitude polar diagrams to provide information regarding the dimensionality of resistivity variation. They also show relative resistivity of a near surface anomaly, and the information regarding the depth of the anomaly when there is only one anomaly. However, in real situations, the anomaly at depth is often masked by a surface anomaly. Such a model is shown in FIG. 1C where the model includes a 5 ohm meter surface anomaly and a 2 ohm meter plug 14 in a 50 ohm meter background. It would be difficult to distinguish the amplitude polar diagram of FIG. 1C from the amplitude polar diagram of FIG. 1A without prior knowledge of the existence of two anomalies. In amplitude polar diagrams of this nature, a surface anomaly often obscures the existence of a deeper anomaly.

Figure 2:
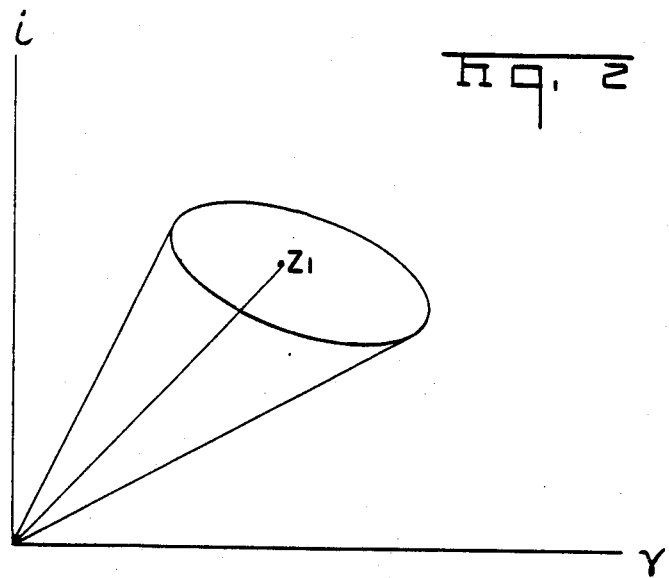
FIG. 2 is the rotational locus of $Z_{xy}$ or $Z_{yx}$ in the complex plane.
Figure 2A:
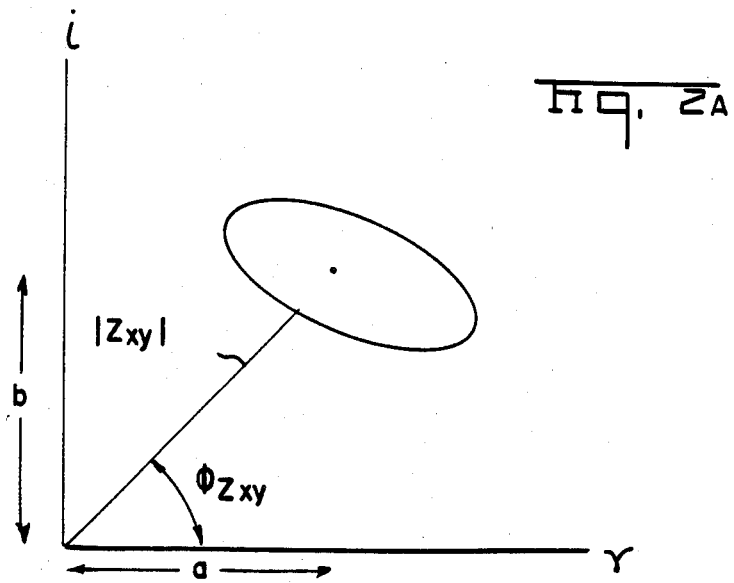
FIG. 2A is the amplitude and phase of the impedance component in FIG. 2.

The determinant of the matrix of impedance tensor components is invariant under rotation, that is, it does not depend on the direction of measuring co-ordinates. Hence, the determinant reduces four complex direction dependent impedance components to one complex quantity which is direction independent. Thus, in the complex plane, determinant is represented by a single point with an amplitude (from which is derived $\rho_{DET}$) and a phase. FIGS. 2 and 2A are useful in understanding the phase. FIG. 2 shows the rotational locus of $Z_{xy}$ or $Z_{yx}$ in the complex plane. FIG. 2A shows the amplitude and phase of the impedance component in FIG. 2.

More specifically, $\rho_{DET}$ and $\phi_{DET}$ are defined as:

$$\rho_{DET} = (a^2 + b^2) = \frac{1}{\mu\omega} ||Z_{xx}Z_{yy} - Z_{xy}Z_{yx}||$$

$$\phi_{DET} = \tan^{-1}\frac{b}{a} = \tan^{-1}\frac{Im(Z_{xx}Z_{yy} - Z_{xy}Z_{yx})}{Re(Z_{xx}Z_{yy} - Z_{xy}Z_{yx})}$$

In the foregoing $\mu$ is permeability constnat, $\omega$ is $2\pi$ times the frequency of the measurements and the double vertical bars indicate the square of the absolute value of the quantity therein. In accordance with the present invention, contours of $\rho_{DET}$ and $\phi_{DET}$ are plotted.

The present invention is described in the flow chart of FIG. 3. Magnetotelluric measurements of $E_x$, $E_y$, $H_x$ and $H_y$ taken at sites along all lines of exploration X and Y, are inputted to to the processor as indicated at 15. These measurements are filtered as indicated at 16 to provide measurement samples at successively lower frequencies, representing successively lower depths and impedance tensors are calculated. The absolute value of the determinant of the tensor components relating the earth's electric and magnetic fields is determined as indicated at 17. The value of the determinant is:

$$DET = Z_{xx}Z_{yy} - Z_{xy}Z_{yx}$$

Hence the determinant can be calculated very easily once $Z_{xx}$, etc. are known. $Z_{xx}$, etc. are determined from power spectra and cross spectra of $E_x$, $E_y$, $H_x$, $H_y$ as follows which is based on the work of Charles Swift, Jr., Ph.D. Thesis, Un. of Mass. Inst. of Tech., Cambridge, "A Magnetotelluric Investigation of an Electric Conductivity in the Southwestern United States."

$$Z_{xx} = \left|\frac{E_x}{H_x}\right| \left(\frac{Coh\ E_xH_x - Coh\ E_xH_y\ Coh\ H_yH_x}{1 - |Coh\ H_xH_y|^2}\right)$$

-continued $$Z_{xy} = \left|\frac{E_x}{H_y}\right| \left(\frac{Coh\ E_xH_y - Coh\ E_xH_x\ Coh\ H_xH_y}{1 - |Coh\ H_xH_y|^2}\right)$$

etc... where $$Coh\ E_xH_y = \frac{Cross\ Spectrum\ <E_x\bar{H_y}>}{Auto\ Spectra\ (<E_x\bar{E_x}><H_y\bar{H_y}>)^{\frac{1}{2}}}$$

$|E_x| = (<E_xE_x>)^{\frac{1}{2}}$ Fourier Amplitude Spectrum

The phase of this determinant is determined as indicated at 18. Equal values of $\rho_{DET}$, determined from the magnitude of the determinant and frequency are selected as indicated at 19 and equal values of the phase of the determinant are selected as indicated at 20. The foregoing steps are repeated for all frequencies as indicated at 21 and for all sites along the lines of exploration X and Y as indicated at 22 and 22a.

In accordance with the present invention, contours of the equal values of phase, $\phi_{DET}$, are plotted as indicated at 23. Contours of the equal values of $\rho_{DET}$, are plotted as indicated at 24. Where there are measurements along more than one line of exploration, the further steps 25 and 26 of plotting $\rho_{DET}$ and $\phi_{DET}$ as functions of X and Y for successive frequencies are performed. This produces plots which are very useful to the interpreter, as will be illustrated by the following examples.

Figure 4C:
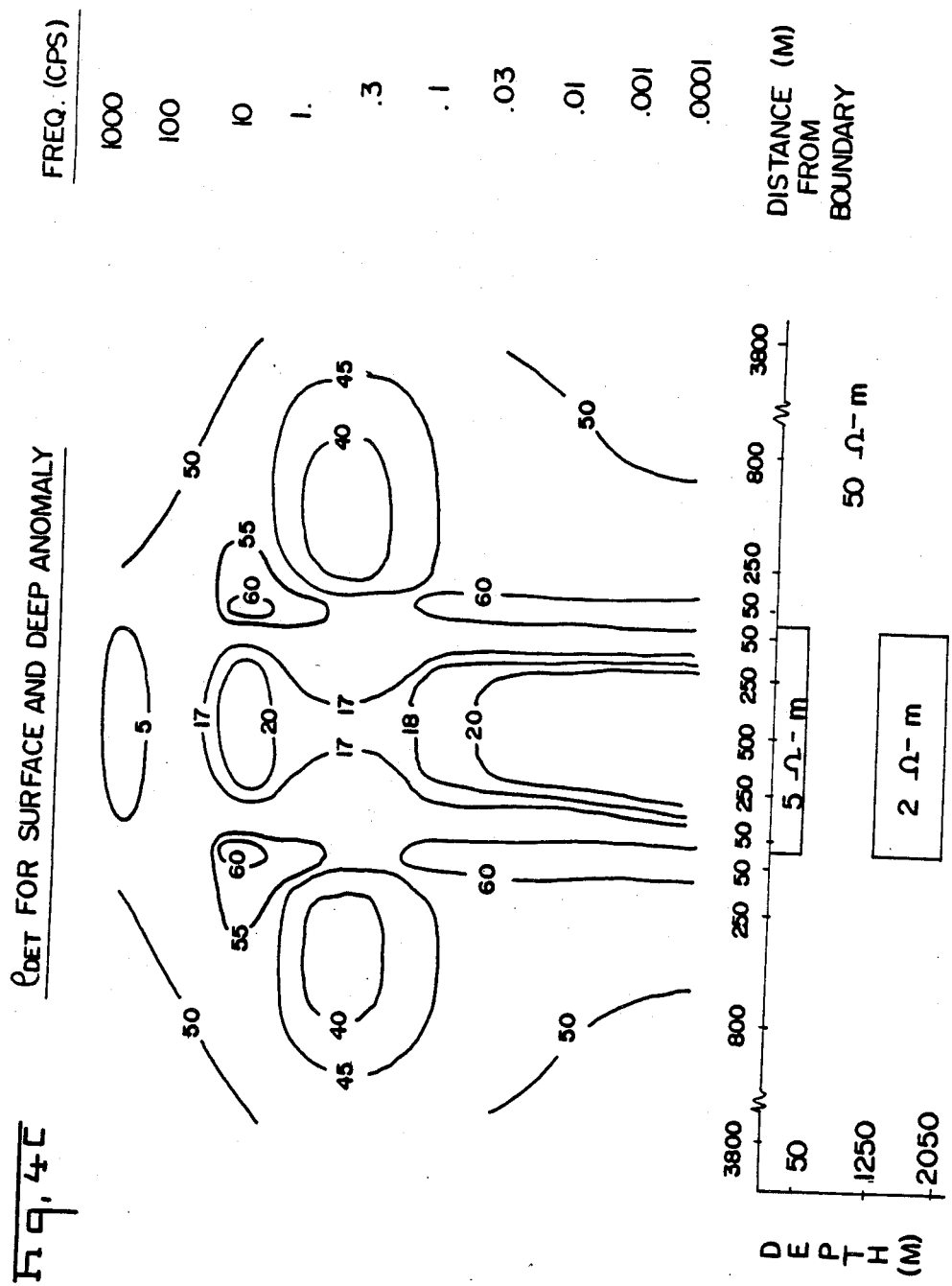
Figure 4F:
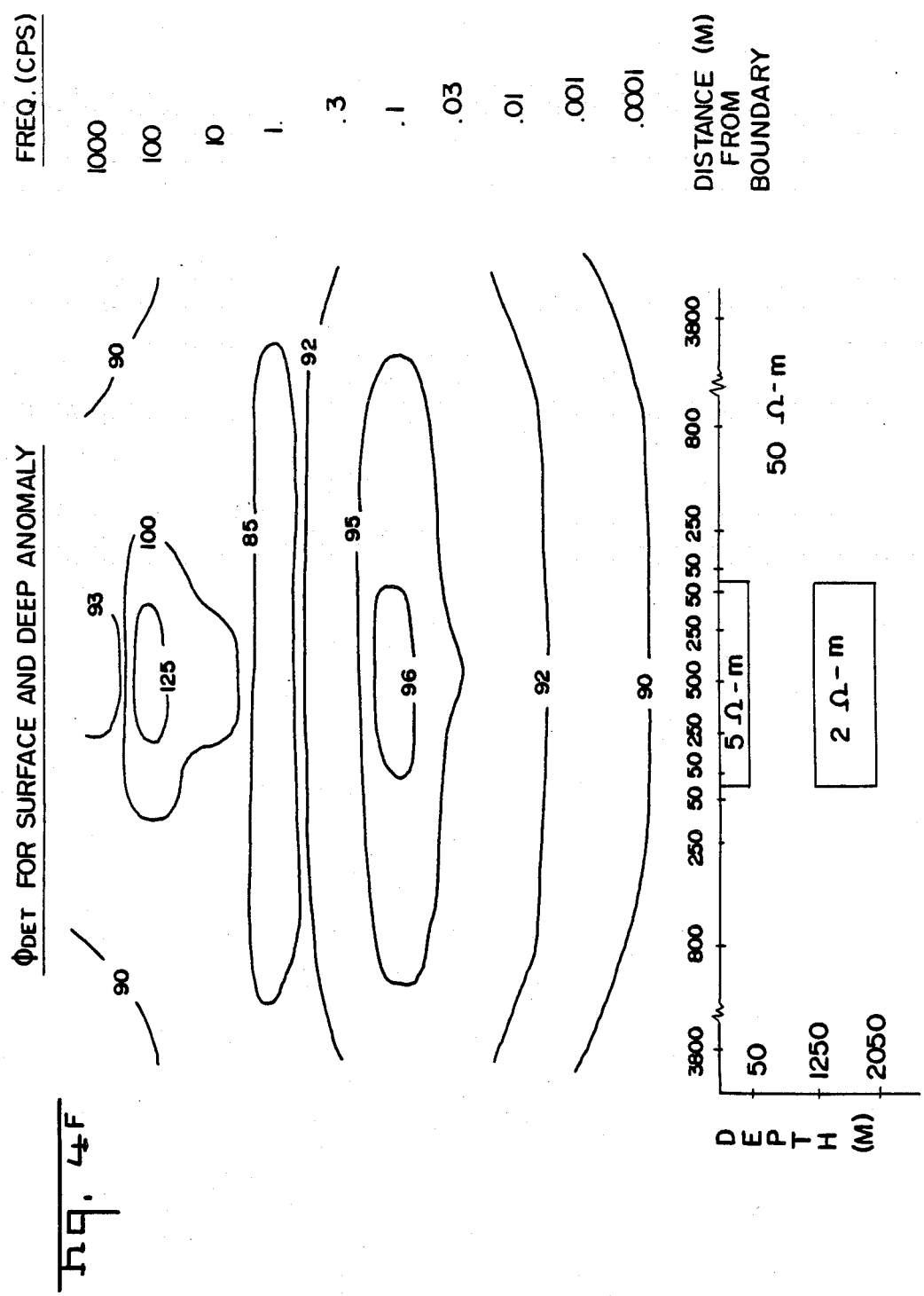
Figure 51:
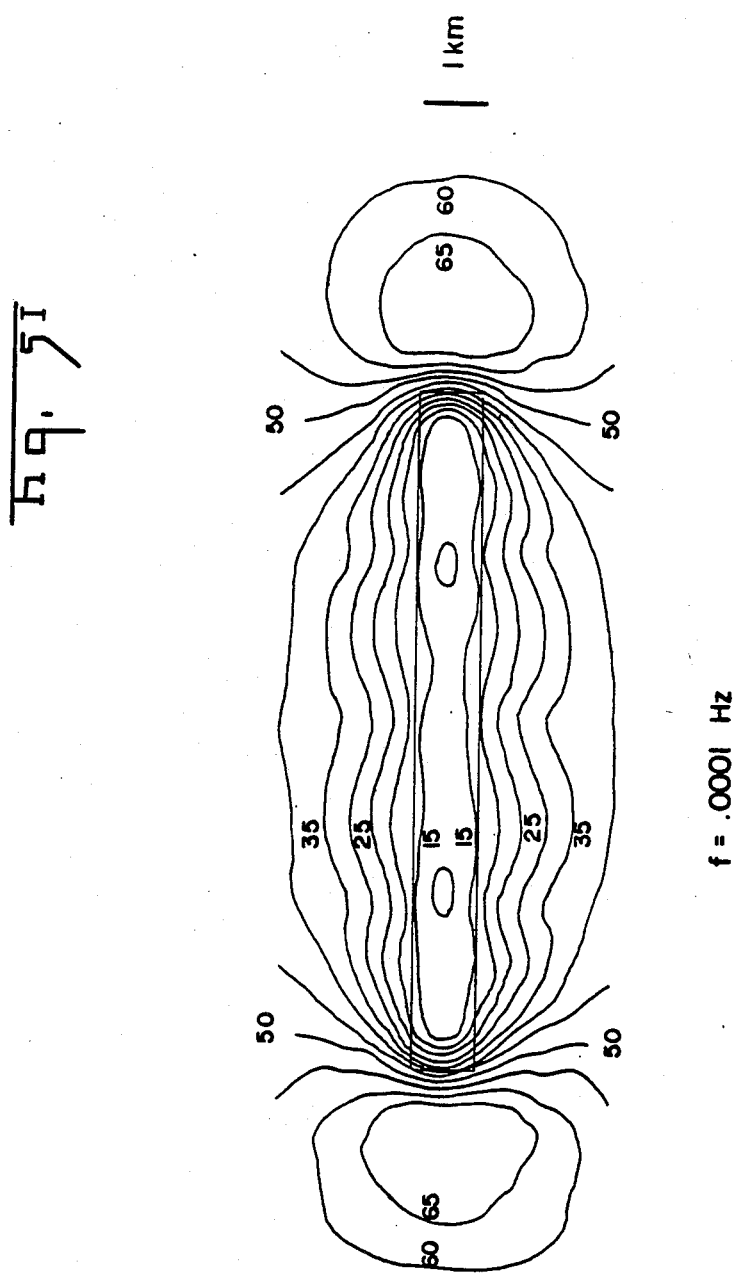

FIGS. 4A–4F are contour maps produced in accordance with the present invention for the same three models shown in FIGS. 1A–1C. FIGS. 4A–4C are contour plots of $\rho_{DET}$ and FIGS. 4D–4F are contour plots of $\phi_{DET}$. The plots of $\rho_{DET}$ in FIGS. 4A and 4B correctly show the locations of the near surface anomaly and the buried plug. They additionally show that the anomaly is conductive with respect to the background. FIG. 4A demonstrates that $\rho_{DET}$ shows the effects of a surface anomaly at all depths below the anomaly. Note that in FIG. 4C the contour lines are parallel below 0.1 cps. $\rho_{DET}$ in the vicinity of the anomaly first increases, then decreases, and finally increases once again as the frequency decreases. This clearly shows that the anomaly at depth is also a conductive anomaly.

The plots of $\phi_{DET}$ in FIGS. 4D–4F show the same good results, the important difference being that at frequencies very different from optimum frequency $\phi_{DET}$ returns to 90° which is the value for a homogeneous medium. The effects of an anomaly are not carried over to all successive frequencies (depths).

In FIGS. 4E and 4F, $\phi_{DET}$ decreases before increasing. This is because of the behavior of magnetotelluric fields at boundaries. If a conductive boundary is approached from a resistive side, the apparent resistivity first increases and then decreases. Similarly, if a resistive boundary is approached from a conductive medium, the apparent resistivity first decreases and then increases.

Figure 5L:
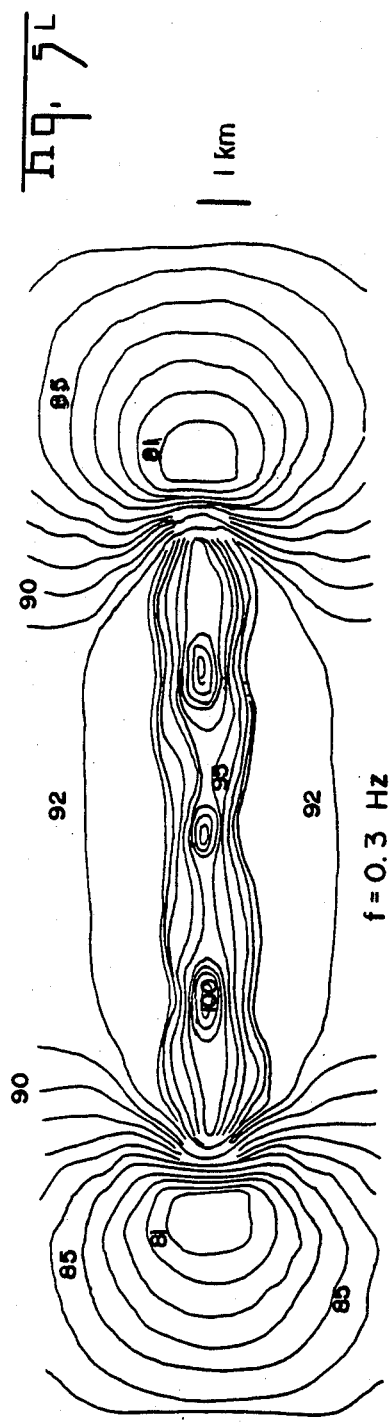
Figure 5M:
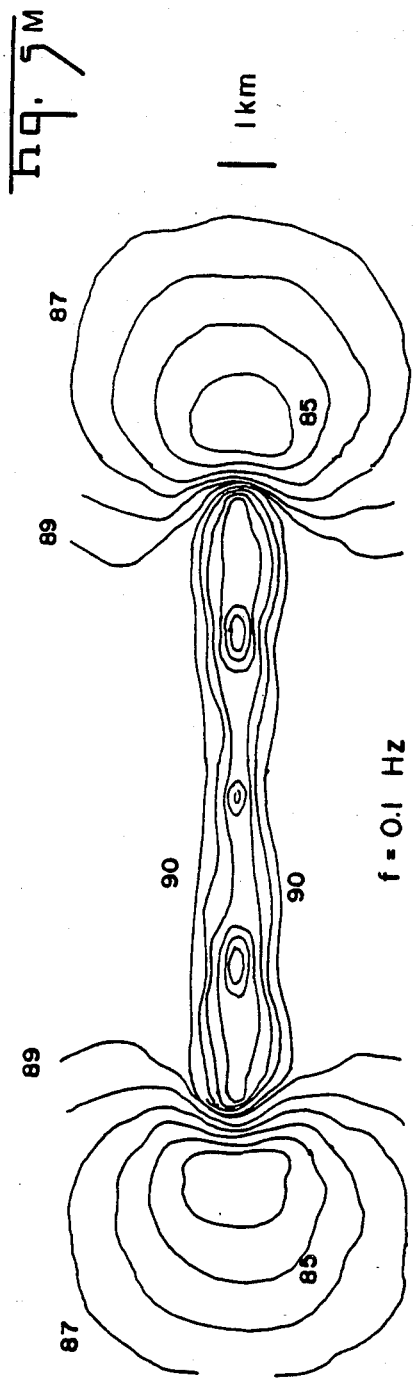
Figure 61:
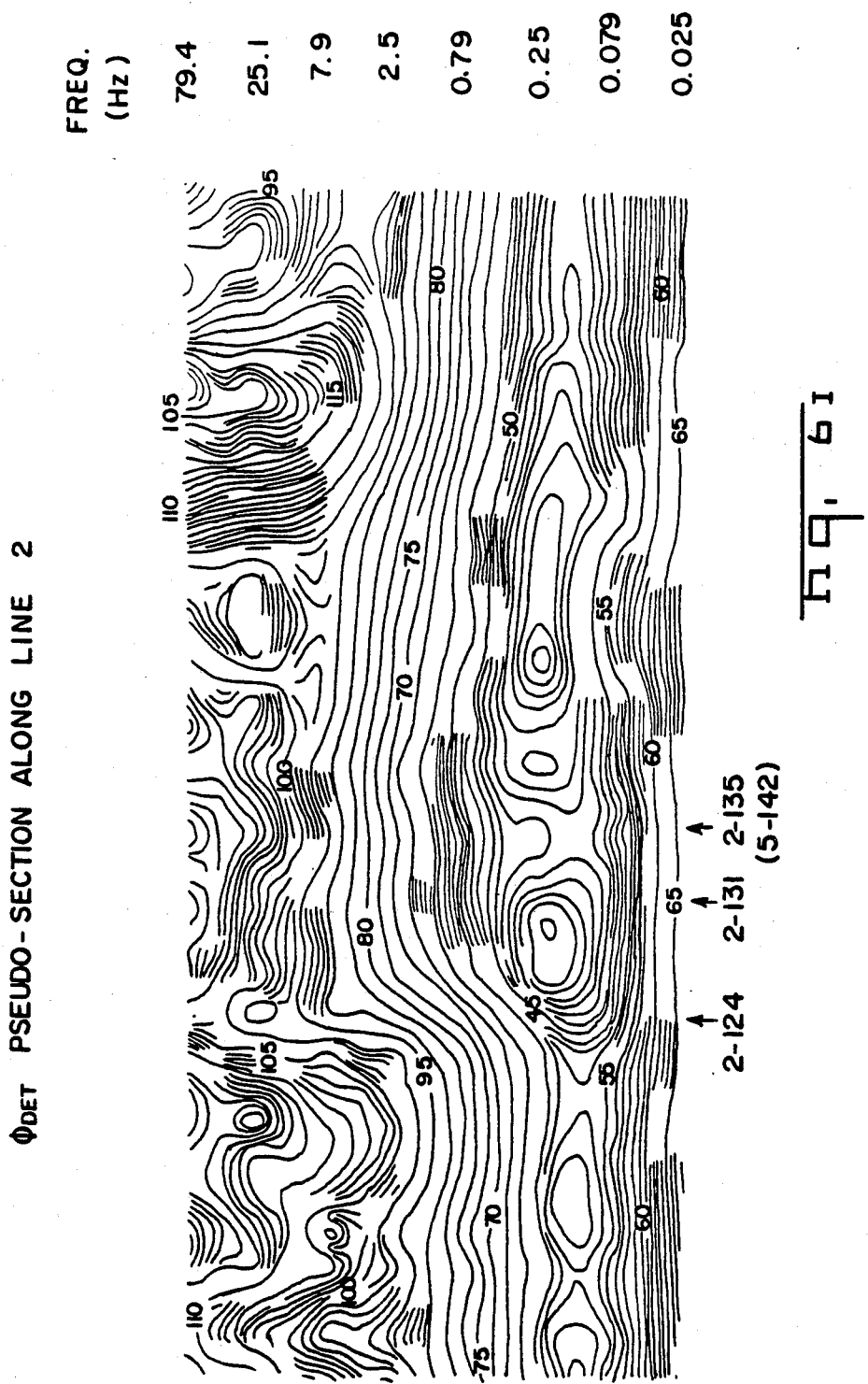

Only two dimensional anomalies have been studied thus far. However, the great usefulness of the present invention is best illustrated with respect to anomalies having resistivity changes in three directions. A model of such an anomaly is shown in FIG. 5. FIG. 5 shows a prism of dimensions of 1 km×10 km×2 km buried at a depth of 500 meters. The prism has a resistivity of 2 ohm meters, while the resistivity of the homogeneous background has a value of 500 ohm meters. FIGS. 5A–5I are computer contour maps of $\rho_{DET}$ for this model and FIGS. 5J–5Q are computer contour maps of $\phi_{DET}$ for the model of FIG. 5. In FIGS. 5A–5Q, the abscissa represents distance alone the line of exploration X and the ordinate represents distance along the line of exploration Y. As was the case with the two dimensional anomaly, contours of $\rho_{DET}$ show the anomaly effects at very low frequencies, even though the anomaly is only at a shallow depth. $\rho_{DET}$ as shown in FIGS. 5A–5I contours the anomaly very well. The inside contours have lower $\rho_{DET}$ values clearly showing the anomaly to be a conductive one compared to the background. The contour maps of $\phi_{DET}$ in FIGS. 5J–5Q show the same effect. The value of $\phi_{DET}$ increases toward the center of the contours, showing the anomaly to be conductive. Again, the important difference between the contours of $\rho_{DET}$ and $\phi_{DET}$ is that at frequencies very different from the optimum frequency, $\phi_{DET}$ returns to the normal value, in this case 90°, because the anomaly is embedded in a homogeneous medium. This property makes plot of $\phi_{DET}$ quite useful for mapping anomalies.

The present invention applied to actual field data is shown in FIGS. 6A–6P. FIGS. 6A and 6B respectively show a structural contour map and a geologic cross-section of an anticline which is a sharply assymetrical, elongated doubly plunging fold. It is approximately twenty miles long and six miles wide with the axis striking N55° W. It dips about 68° on the southwest limb and 4° to 5° on the northeast limb. It plunges southeastward at about 1,000 ft. per mile and at northwest end about 250 ft. per mile. The true scale structure cross-section is shown in FIG. 6B. The cross-section was constructed to honor all the available data; namely surface dips, measured stratigraphic thicknesses as well as subsea datums and formation thicknesses as encountered in the wells shown on the section.

FIG. 6A shows the four lines of exploration along which magnetotelluric measurements were made.

FIGS. 6C–6H show computer contour maps of $\phi_{DET}$ for frequencies from 7.9 to 0.025 Hz. Since $\rho_{DET}$ and $\phi_{DET}$ provide essentially the same information in this case, only $\phi_{DET}$ is shown because it gives a very complete picture.

At 7.94 Hz the contour lines away from line 5 can be considered essentially parallel, especially since some of the contours are closed in areas where there is no data. On line 5 $|\phi_{DET}|$ is in general smaller than in the adjoining area, showing the resistivity along line 5 to be higher. At 2.5 Hz the contours are still parallel to each other, except close to line 5. $|\phi_{DET}|$ everywhere is smaller than it was at 7.9 Hz, suggesting a general increase in resistivity with depth. The resistivity along line 5 is higher and falls as we move away from it. The decreasing of resistivity is slow as we move in a northeast direction towards line 4, but on the southwest side of line 5 the change is rapid. At 0.79 Hz the general decrease in $|\phi_{DET}|$ i.e., increase in resistivity, continues but here the contours look different in that now there is a clear gradient in resistivity along line 5. The resistivity maximum is at the southeast end of line 5. The resistivity still decreases steeply on the southwest side of line 5. At 0.25 Hz there is a further increase in resistivity throughout the area and a decrease in gradient along line 2, but the gradient along line 5 increases. At 0.079 Hz there is an overall decrease in resistivity and the variation in $|\phi_{DET}|$ i.e., resistivity is greatly reduced which implies that at this frequency subsurface structure has only very little effect on $|\phi_{DET}|$ and $|\phi_{DET}|$ now reflects more of the basement response. This is seen even more clearly at 0.025 Hz where $\phi_{DET}$ of the entire region does not vary by more than about 5°.

Thus we see from a study of $|\phi_{DET}|$ that the subsurface structure has a resistivity higher than the overburden. This structure seems to extend along line 5 and it has a steep resistivity gradient on the southwest side and a very small gradient on the northeast side. Within the structure itself, there appears to be a rather high gradient in the southeast direction and the resistivity increases in this direction. These variations in resistivity correlate closely with structural variations of the anticline. The basement of this structure appears to be layered.

In order to show resistivity variation with frequency along each line, the cross-sections FIGS. 6I–6P were plotted. Compare the $\phi_{DET}$ section along line 2 (FIG. 6I) with the geologic cross-section along the line and see how closely the psuedo-section resembles the geologic cross-section. The actual depths cannot be determined from the pseudo-section since the presence of more than one resistivity complicates the skindepth-resistivity relationship. Actual depths can only be determined by quantitative analysis but pseudo-sections do provide a feeling for depths which would be useful in modeling.

In order to obtain a more complete picture, two additional high frequencies were included, viz. 79.4 and 25.1 Hz. For the same purpose $\rho_{DET}$ sections were also plotted as shown in FIGS. 6M–6P.

The $\phi_{DET}$ pseudo-section along line 2 is shown in FIG. 6I. The geological cross-section along the same line is shown in FIG. 6B. Stations 2-124, 2-131 and 2-135, which is approximately the same position as 5-142, are shown in both the figures. In FIG. 6I up to 7.9 Hz the contours are very complicated showing the variability of near surface resistivity. From 7.9–0.0079 Hz the contours show systematic variation in resistivity. The most remarkable feature of these contours is the folding of the lines into an anticline in the vicinity of station 2-124. Comparing this fold with the actual folding of the beds in the geologic cross-section (FIG. 6B), we find that the two folds occur about the same place, as indicated by the position of the stations and also have about the same shape. Thus, it appears that $|\phi_{DET}|$ (and also $\rho_{DET}$) are very useful in structural mapping.

Figure 6M:
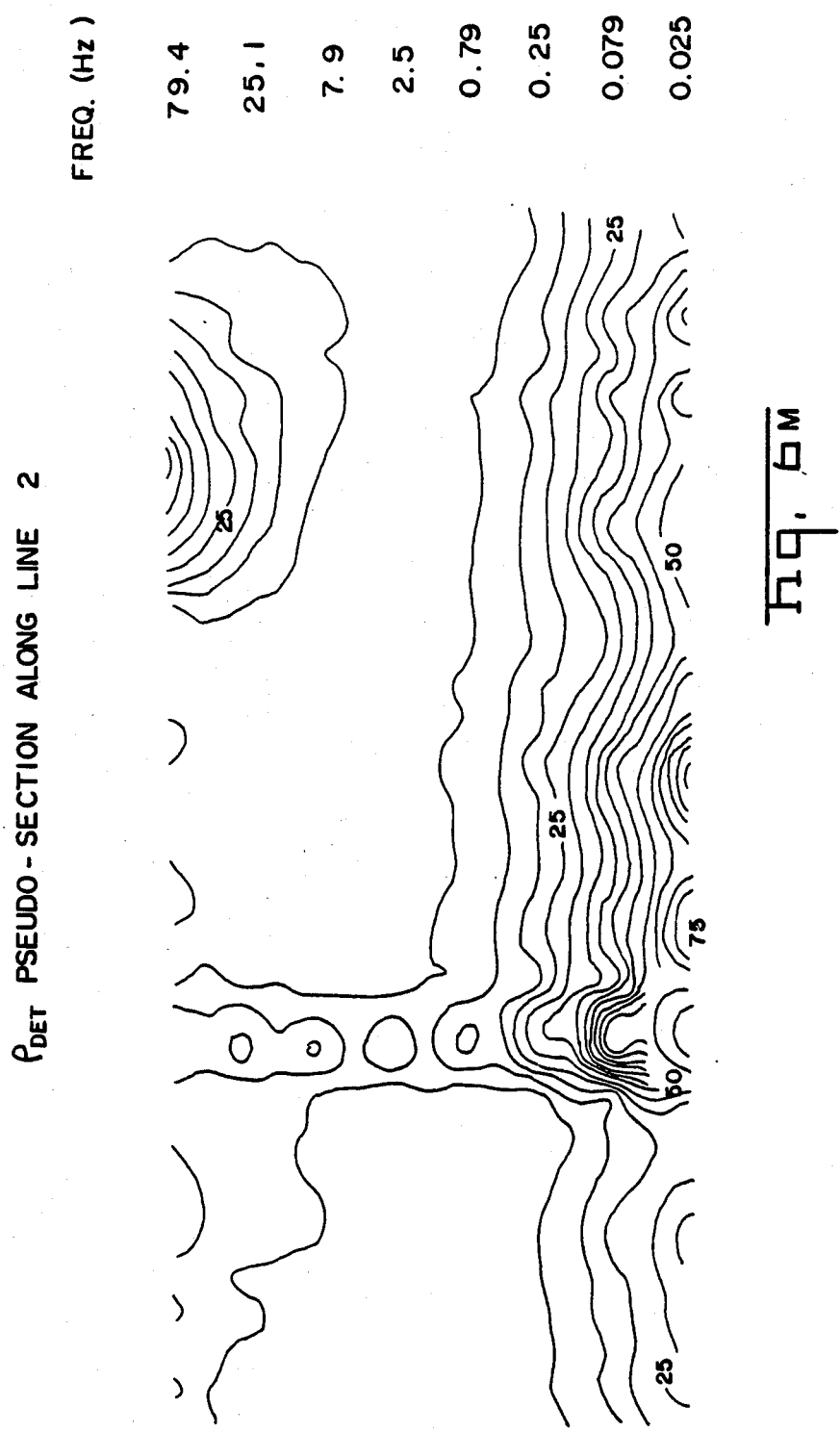

The variation in resistivity observed in map contours seems to have been caused by structural variation. The resistivity of the folded bed (beds) is higher than the overburden and because of the steep anticlinal fold the resistive bed is closer to the surface on one side of the fold than the other. This difference in resistivity on the two sides of the fold can be seen much more clearly in the $\rho_{DET}$ pseudo-section (FIG. 6M). Below the substructure (FIG. 6I) the contours are horizontal suggesting the basement to be layered.

The pseudo-sections along line 3 (FIGS. 6J and 6N) are similar to the pseudo-section along line 2. But there are some differences. By a comparison of the pseudo-sections of the two llines it can be seen that the resistivity at the same depth on line 3 is lower than at line 2. The pseudo-sections along lines 4 and 5 (FIGS. 6K and 6O and FIGS. 6L and 6P) show the contour lines at low frequencies to be sloping from line 2 to line 3. This sloping is seen much more clearly in $\rho_{DET}$ pseudo-sections. If this is assumed to indicate subsurface structure sloping gradually in the direction of line 2 to line 3, then resistivity variation along line 5 can be explained in terms of the resistive subsurface structure being closest to the surface at the southeast end of line 5. We then have a double fold close to the southeast end of line 5—one along southwest leveling off as we move in the northeast direction towards line 4 and another along southeast leveling off as we move in the northwest direction towards line 3. This could explain the strong three dimensional effect observed at the southeast end of line 5.

The contour plots discussed above were produced ona a Control Data Corporation computer Cyber 170 system Model 750 with with a Status Plotter by Varian. The programming required will be apparent from the foregoing and from the users' manual for the particular computer system which is used to practice the invention.

While a particular embodiment of the invention has been shown and described, various modifications are within the true spirit and scope of the invention. The appended claims are, therefore, intended to cover all such modifications.

What is claimed is:

1. In magnetotelluric exploration wherein orthogonal measurements $E_x$ and $E_y$ of the earth's telluric field and orthogonal measurements $H_x$ and $H_y$ of the earth's magnetic field are made along a line of exploration, said magnetotelluric measurements being related to the impedance of the earth by the determinant of the matrix of impedance tensor components:

$$\begin{bmatrix} E_x \\ E_y \end{bmatrix} = \begin{bmatrix} Z_{xx} & Z_{xy} \\ Z_{yx} & Z_{yy} \end{bmatrix} \begin{bmatrix} H_x \\ H_y \end{bmatrix}$$

where $$\begin{bmatrix} Z_{xx} & Z_{xy} \\ Z_{yx} & Z_{yy} \end{bmatrix}$$

is the impedance tensor relating the earth's electric fields $E_x$, $E_y$ to the earth's magnetic fields $H_x$, $H_y$, the method of plotting said magnetotelluric measurements to distinguish the structure of resistivity anomalies and separate near surface and depth anomalies comprising:
  filtering magnetotelluric measurements of $E_y$, $E_y$ $H_x$ and $H_y$ taken at sites along lines of exploration x and y to produce measurements of $E_x$, $E_y$, $H_x$ and $H_y$ for a plurality of successively low frequencies, each successively lower frequency representing a successively lower depth;
  determining the phase ($\phi_{DET}$) of the determinant of the matrix of impedance tensor components for said filtered measurements;
  plotting contours of equal values of the phase of said determinant as a function of the points on said line of exploration at which said measurements were made, for each of said successively lower frequencies.

2. The method recited in claim 1 further comprising: for each of said successively lower frequencies, plotting contours of equal values of the resistivity of said determinant ($\rho_{DET}$) as a function of the points on said line of exploration at which said measurements were made.

3. The method recited in claim 2 performed on a general purpose digital computer to produce computer contour maps of $\phi_{DET}$ and $\rho_{DET}$.

4. The method recited in claim 2 wherein contours of $\rho_{DET}$ and $\phi_{DET}$ are plotted as functions of distance along the line of exploration and frequency.

5. The method recited in claim 2 wherein said orthogonal measurements of the earth's telluric field and magnetic field are made along two lines of exploration X and Y, said method further comprising:
  plotting contours of $\rho_{DET}$ and $\phi_{DET}$ as a function of distance along each of said lines of exploration X and Y for successive frequencies.

6. In magnetotelluric exploration wherein orthogonal measurements $E_x$ and $E_y$ of the earth's telluric field and orthogonal measurements $H_x$ and $H_y$ of the earth's magnetic field are made along a line of exploration, said magnetotelluric measurements being related to the impedance of the earth by the determinant of the matrix of impedance tensor components:

$$\begin{bmatrix} E_x \\ E_y \end{bmatrix} = \begin{bmatrix} Z_{xx} & Z_{xy} \\ Z_{yx} & Z_{yy} \end{bmatrix} \begin{bmatrix} H_x \\ H_y \end{bmatrix}$$

where $$\begin{bmatrix} Z_{xx} & Z_{xy} \\ Z_{yx} & Z_{yy} \end{bmatrix}$$

is the impedance tensor relating the earth's electric fields $E_x$, $E_y$ to the earth's magnetic fields $H_x$, $H_y$, the method of plotting said magnetotelluric measurements to distinguish the structure of resistivity anomalies and separate near surface and depth anomalies comprising:
  filtering magnetotelluric measurements of $E_y$, $E_y$ $H_x$ and $H_y$ taken at sites along lines of exploration x and y to produce measurements of $E_x$, $E_y$, $H_x$ and $H_y$ for a plurality of successively lower frequencies, each successively lower frequency representing a successively lower depth;
  determining the absolute resistivity value ($\rho_{DET}$) of the determinant of the matrix of said impedance tensor;
  determining the phase ($\phi_{DET}$) of the determinant of the matrix of said impedance tensor;
  selecting equal values of $\rho_{DET}$;
  selecting equal values of $\phi_{DET}$;
  plotting contours of equal values of $\rho_{DET}$ as functions of distance along said line of exploration and frequency; and
  plotting contours of equal values of $\phi_{DET}$ as functions of distance along said line of exploration and frequency.

7. The method recited in claim 6 wherein said orthogonal measurements of the earth's telluric field and magnetic field are made along two lines of exploration X and Y, said method further comprising:
  plotting contours of $\rho_{DET}$ and $\phi$DET as a function of distance along each of said lines of exploration X and Y for successive frequencies.

* * * * *